United States Patent [19]
Wakahara et al.

[11] Patent Number: 5,819,192
[45] Date of Patent: Oct. 6, 1998

[54] TRANSFER FOR MOTOR VEHICLE

[75] Inventors: Tatsuo Wakahara, Kawasaki; Kenichirou Murakami, Ebina; Masaki Ohki, Ebina; Koichi Hayasaki, Ebina, all of Japan

[73] Assignee: Nissan Motor Co., Ltd., Yokohama, Japan

[21] Appl. No.: 925,633

[22] Filed: Sep. 9, 1997

Related U.S. Application Data

[63] Continuation of Ser. No. 341,155, Nov. 16, 1994, abandoned.

[30] Foreign Application Priority Data

| Nov. 16, 1993 | [JP] | Japan | 5-287114 |
| Dec. 27, 1993 | [JP] | Japan | 5-333459 |
| Dec. 27, 1993 | [JP] | Japan | 5-348836 |

[51] Int. Cl.⁶ .................................................. B60K 23/08
[52] U.S. Cl. .......................... 701/67; 701/69; 701/87; 701/71; 180/247; 192/109 F
[58] Field of Search .................. 701/67, 69, 87, 701/89, 71; 180/247, 248; 192/109 F

[56] References Cited

U.S. PATENT DOCUMENTS

| 4,771,852 | 9/1988 | Nishikawa et al. | 180/247 |
| 4,773,500 | 9/1988 | Naito et al. | 180/233 |
| 4,795,011 | 1/1989 | Ushijima et al. | 192/0.032 |
| 4,805,750 | 2/1989 | Nitz | 192/3.58 |
| 4,856,380 | 8/1989 | Murano et al. | 192/3.58 |
| 4,887,689 | 12/1989 | Naito | 180/233 |
| 4,895,217 | 1/1990 | Hueckler et al. | 180/233 |
| 5,033,575 | 7/1991 | Takeshita et al. | 180/249 |
| 5,070,747 | 12/1991 | Lentz et al. | 74/866 |
| 5,119,298 | 6/1992 | Naito | 364/426.02 |
| 5,126,942 | 6/1992 | Matsuda | 364/426.02 |
| 5,251,719 | 10/1993 | Eto et al. | 180/197 |

OTHER PUBLICATIONS

"Service Manual For Nissan Skyline (R33–2) F006733" issued by Nissan Motor Co., pp. C–4 to C–20, Nov. 1993.

*Primary Examiner*—Kevin J. Teska
*Assistant Examiner*—Thai Phan
*Attorney, Agent, or Firm*—Foley & Lardner

[57] ABSTRACT

There is disclosed a motor vehicle having a set of front wheels, a set of rear wheels, an engine, and a transmission driven by the engine and having a transmission output shaft. The motor vehicle further has a transfer including a variable torque trasmitting (VTT) clutch for varying a distribution of torque between the set of front wheels and the set of rear wheels depending upon degree of engagement thereof. A clutch activating pressure is generated and transmitted to the VTT clutch under the control of a mode selector valve.

66 Claims, 22 Drawing Sheets

TRANSFER FOR MOTOR VEHICLE

This application is a continuation of application Ser. No. 08/341,155, filed Nov. 16, 1994, abandoned.

BACKGROUND OF THE INVENTION

The present invention relates to a transfer for a motor vehicle.

In order to achieve an ideal turning performance, an enhanced stability during straight forward running and an enhanced stability under braking, it is known to install a transfer in a powertrain of a motor vehicle to vary distribution of engine torque between front wheels and rear wheels. Various systems have been proposed which can vary the distribution of torque between front wheels and rear wheels.

An object of the present invention is to provide an alternative to such proposed systems.

SUMMARY OF THE INVENTION

According to the present invention, there are provided:

means, including a variable torque trasmitting (VTT) clutch, for varying a distribution of torque produced by the engine between a set of front wheels of a motor vehicle and a set of rear wheels of the motor vehicle depending upon degree of engagement of said VTT clutch;

means for generating a line hydraulic fluid pressure;

means fluidly connected to said line hydraulic fluid pressure generating means for generating a clutch activating hydraulic fluid pressure;

means for transmitting said clutch activating fluid pressure to said VTT clutch; and means for controlling said line hydraulic fluid pressure generating means, clutch activating hydraulic fluid pressure generating means and clutch activating hydraulic fluid pressure transmitting means.

DETAILED DESCRIPTION OF THE INVENTION

Figure 1:
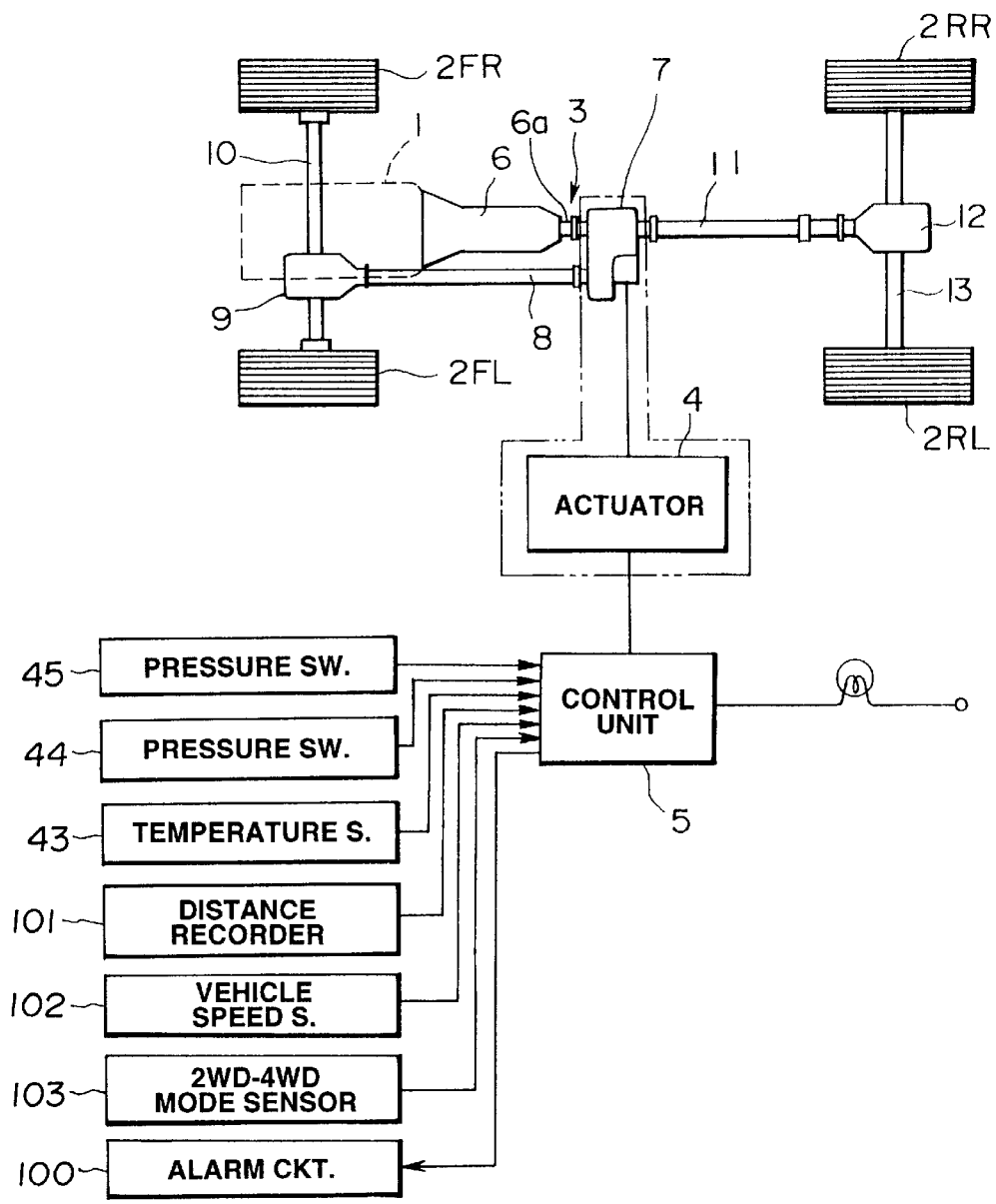
FIG. 1 is a block diagram of a motor vehicle.

Referring to FIG. 1, a motor vehicle is shown which includes an engine 1, a set of front wheels 2FL and 2FR, a set of rear wheels 2RL and 2RR, a powertrain generally designated by the reference numeral 3, an actuator 4, and a control unit 5.

The powertrain 3 includes a transmission 6 driven by the engine 1, and a transfer 7. The transmission 6 has a transmission output shaft 6a. The transfer 7 is operative to vary distribution of torque between the set of front wheels 2FL and 2FR and the set of rear wheels 2RL and 2RR. In two-wheel drive (2WD) mode, all of the torque is transferred from the transmission output shaft 6a to the set of rear wheels 2RL and 2RR through the transmission output shaft 6a, the transfer 7, a rear propeller shaft 11, and a rear final drive which includes a rear differential 12 with rear drive axles 13. In four-wheel drive (4WD) mode, a portion of the torque is transferred to the set of front wheels 2FL and 2FR through the transfer 7, a front propeller shaft 8 and a front final drive including a front differential 9 with front drive axles 10. The balance of the torque is transferred to the set of rear wheels 2RL and 2RR.

The ratio of distribution of torque depends upon the magnitude of hydraulic fluid pressure build-up in the transfer 7 by the actuator 4. The control unit 5 controls the actuator 4 such that the transfer 7 varies the distribution of torque from 2WD in which a ratio between front and rear is 0:100 to 4WD in which the ratio is 50:50.

Figure 2:
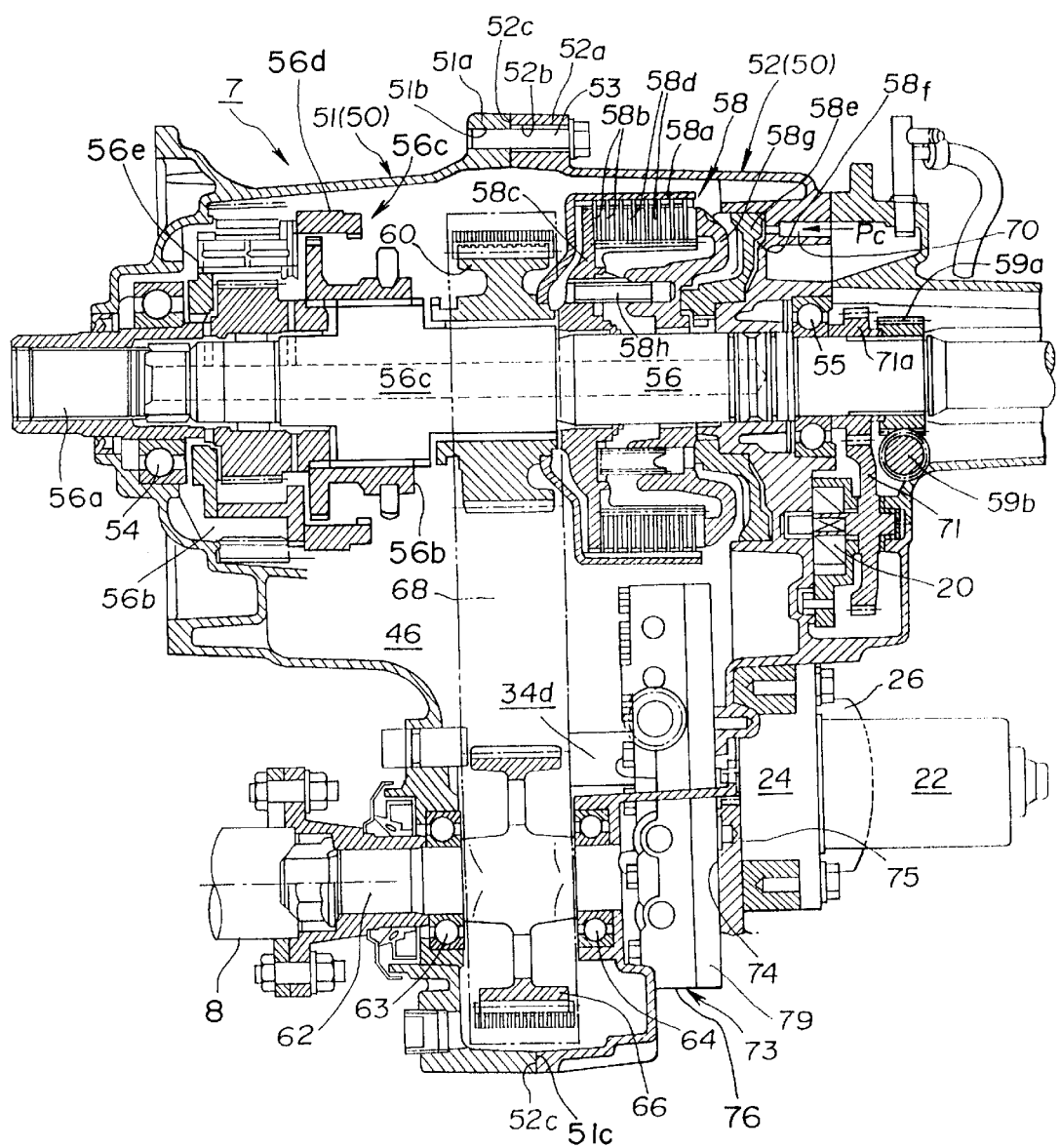
FIG. 2 is a section of a transfer.
Figure 3:
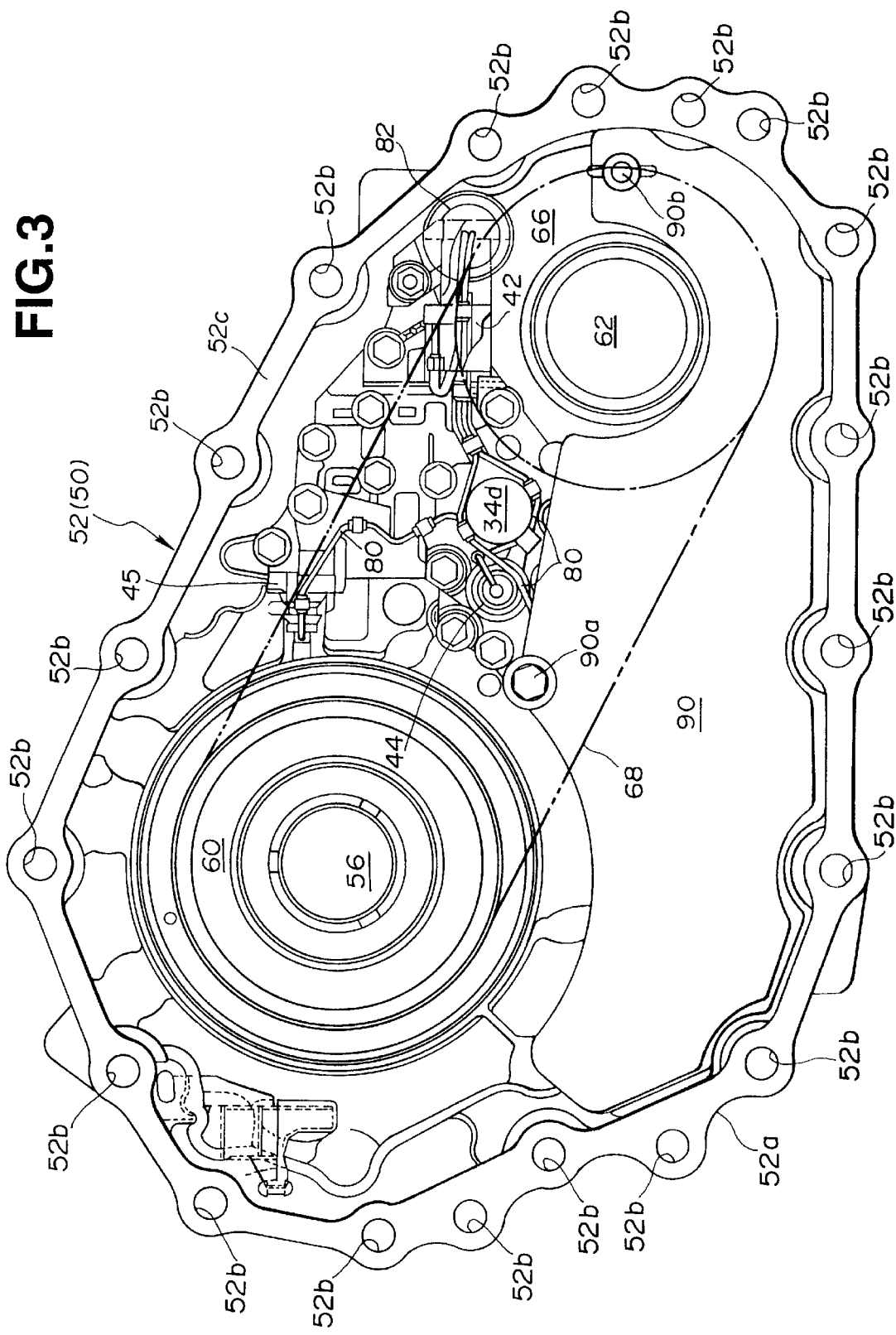
FIG. 3 is a cross section of the transfer.

Referring to FIG. 2, the transfer 7 has a transfer casing generally designated by the reference numerals 50. The transfer casing 50 includes a front casing 51 and a rear casing 52. The front casing 51 has a peripheral flange 51a surrounding an open end thereof, while the rear casing 52 has a peripheral flange 52a surrounding an open end thereof. Referring also to FIG. 3, the flange 52a has a flat face 52c adapted to mate with a flat face 51c of the flange 51a. Cut through the flange 52a are a plurality of, nineteen (19) in this embodiment, bolt holes 52b mating with bolt holes 51b within the flange 51a, respectively. The flanges 51a and 52a are fixedly secured to each other by means of a plurality of bolts, only one being shown at 53 in FIG. 2 with the mating flat faces 51*a* and 52*c* in firm engagement with each other in liquid tight manner. The liquid tight engagement at the flanges 51*a* and 52*a* is needed for the transfer casing 50 to contain hydraulic fluid, i.e., oil.

The front and rear casings 51 and 52 carry bearings 54 and 55, respectively, and they also carry bearings 63 and 64. Within the transfer casing 50, an input shaft 56*a* is rotatably supported by the bearing 54 and hollowed to rotatably receive one end portion of a center drive shaft 56. The opposite end portion of the center drive shaft 56 extends through and is rotatably supported by the bearing 55. A front drive shaft 62 is rotatably supported by the bearings 63 and 64. The drive shaft 62 is supported in parallel relationship with the center drive shaft 56. The input shaft 56*a* is drivingly connected with the transmission output shaft 6*a*, while, the center drive shaft 56 is drivingly connected with the rear propeller shaft 11. The front drive shaft 62 has a lefthand end, as viewed in FIG. 2, drivingly connected with the front propeller shaft 8. Arranged around the center drive shaft 56 is a variable torque transmitting (VTT) clutch 58.

In order to transfer torque from the input shaft 56*a* to the center drive shaft 56, a shift ring 56*b* of a High & Low shift mechanism 56*c* is positioned at a High position as illustrated in FIG. 2. The shift ring 56*b* is splined to the center drive shaft 56 for rotation therewith. In the illustrated position, the shift ring 56*b* engages the input shaft 56*a* to establish a drive connection between the input shaft 56*a* and the center drive shaft 56. The shift ring 56*b* can move to the right, viewing in FIG. 2, toward a Low position. During this rightward movement, the shift ring 56*b* disengages from the input shaft 56*a* and then engages a drum 56*d* and also a sprocket 60 rotatably supported by the center drive shaft 56. The drum 56*d* is rotatable with a pinion carrier 56*e* rotatably supporting a plurality of pinions. These pinions are in meshing engagement with both a ring gear 56*f* and a sun gear 56*g* which the input shaft 56*a* is formed with. The ring gear 56*f* is fixedly anchored to the front casing 51, serving as a reaction member, allowing transfer of torque from the input shaft 56*a* to the drum 56*d* at a reduced speed.

The VTT clutch 58 has a clutch hub 58*c* splined to the center drive shaft 56, a clutch drum 58*a* drivingly connected to the sprocket 60 for unitary rotation therewith. An endless power transmission member in the form of an endless chain 68 interconnects the sprocket 60. and a sprocket 66 integral with the front drive shaft 62. The VTT clutch 58 includes interleaved friction plates 58*b* and friction discs 58*d*. The friction plates 58*b* are splined to the clutch drum 58*a*, while the friction discs 58*d* are splined to the clutch hub 58*c*. In order to bring the friction plates 58*b* into engagement with the friction discs 58*d*, a piston assembly 58*e*, 58*f* and 58*h* is provided. The piston assembly includes a piston 58*e* slidably received in an annular recess of the rear casing 52 to define therein a servo chamber 58*f* which communicates with a port 70 with which the rear casing 52 is formed. Disposed between the piston 58*e* and the friction plate and disc assembly 58*b* and 58*d* is a pressure flange 58*g*. A piston return spring assembly 58*h* acts between the clutch hub 58*c* and the pressure flange 58*g* to bias the piston 58*e* into a spring set position thereof in response to absence of oil pressure within the chamber 58*f*. In this spring set position, the friction plates 58*b* and friction discs 58*d* are disengaged from each other, interrupting drive connection between the center drive shaft 56 and the pulley 60. The pressure transmitted to the chamber 58*f* activates the piston 58*e* so that this pressure is hereinafter called as a clutch activating pressure PC. The magnitude of this pressure PC is variable continuously over a certain range. The piston 58*e* moves the pressure flange 58*g* against the action of the return spring assembly 58*h* into engagement with the clutch plate and disc assembly 58*b* and 58*d*. The magnitude of force with which the clutch plates 58*b* and clutch discs 58*d* are engaged is proportional to the magnitude of the pressure PC. Thus, a ratio of a portion of torque transmitted by the VTT clutch 58 to the pulley 60 to the balance of the torque transmitted to the rear propeller shaft 11 is variable with the magnitude of the pressure PC transmitted to the chamber 58*f*.

The actuator 4 includes a source of hydraulic fluid and a valve assembly 73. As the source of hydraulic fluid, a main pump 20 is mounted within the rear casing 52, and an auxiliary pump 24 is attached to the outer wall of the rear casing 52. The main pump 20 is of the reversible type and driven by the center drive shaft 56 via gears 71*a* and 71. The auxiliary pump 24 is driven by an electric motor 22. In order to mount the auxiliary pump 24 and the electric motor 22, the rear casing 52 has an end wall formed with an outwardly facing flat mount site 75 for the auxiliary pump 24 and an inwardly facing flat mount site 74 for the valve assembly 73. The flat mount sites 74 and 75 extend in parallel relationship with the flat face 52*c* of the flange 52*a*, making machining operation easy.

Figure 5:
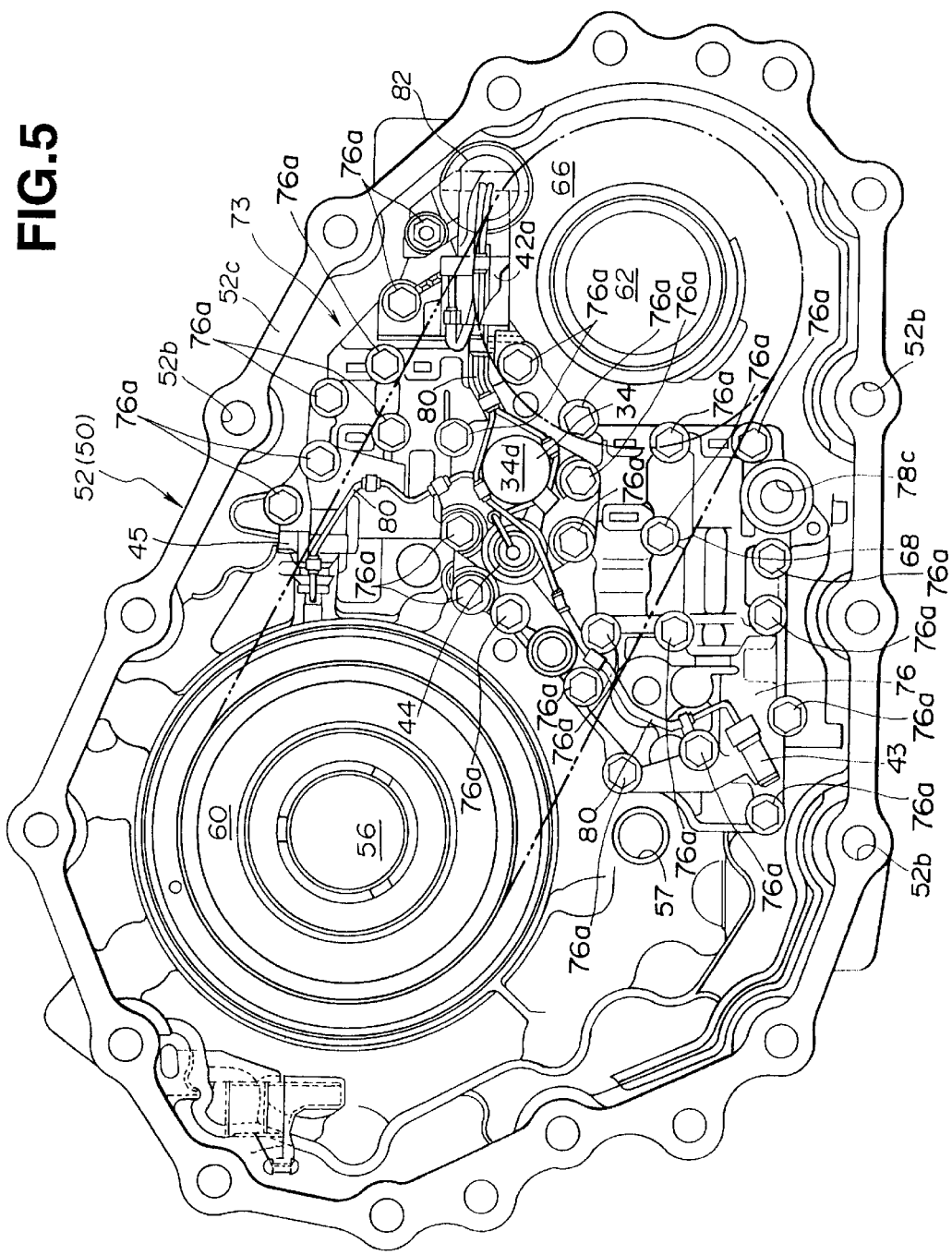
FIG. 5 is a view similar to FIG. 4 with the oil strainer unit removed to show a valve body.

Referring to FIGS. 2 and 5, a valve body 76 of the valve assembly 73 is fixedly secured to the flat mount site 74 with a seating 79 therebetween by means of bolts 76*a*. In FIG. 5, the rear casing 52 has a port 57 communicating with the main pump 20, while the valve body 76 has a port 78*c* communicating with the auxiliary pump 24.

Figure 6:
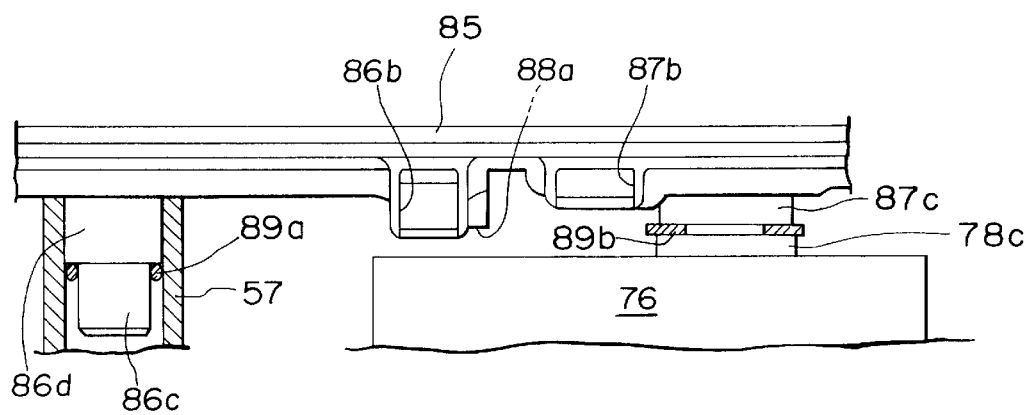
FIG. 6 is a fragmentary view illustrating connection between the oil strainer unit and the valve body.

As best seen in FIG. 6, the port 57 of the rear casing 52 and the port 78*c* of the valve body 76 are coupled with ports 86*d* and 87*c* of an oil strainer unit 85, respectively. The port 86*d* of the strainer unit 85 has a protruded tube 86*c* carrying an O-ring 89*a*. Owing to this O-ring 89*a*, a liquid tight seal between the port 86*d* of the strainer unit 85 and the port 57 of the rear casing 52 is made. The ports 87*c* and 78*c* have annular faces opposed to each other, between which a lip packing 89*b* is disposed. The strainer unit 85 is fixedly bolted to the rear casing 52 at two bolt holes 88 (see FIG. 4) and pressed against the valve body 76 by a baffle plate 90 (see FIG. 3). The baffle plate 90 is fixedly secured to the rear casing 52 by means of bolts 90*a* and 90*b* (see FIG. 3). The strainer unit 85 has a third bolt hole 88*a* (see FIGS. 4 and 8) through which the bolt 90*a* (see FIG. 3) passes. Since the baffle plate 90 biases the strainer unit 85 against the valve body 76, a liquid tight seal between the ports 87*c* and 78*c* is made and the tendency that the strainer unit 85 is deflected due to reaction of the lip packing 89*b* is minimized. As is seen from FIG. 6, the use of the lip packing 89*b* provides a liquid tight seal as long as the annular faces are opposed even in the case where the opening of the port 87*c* fails to align with the opening of the port 78*c*. As a result, an error in a distance L (see FIGS. 7 and 8) between the center of the opening of the port 86*c* and the center of the opening of the port 87*c* does not break the seal between the port 87*c* and 78*c*. As is seen from FIG. 8, the port 87*c* has a relatively wide annular area around the opening thereof and the lip seal 89*b* is attached to the port 87*c* on the relatively wide annular area. This design is intended to allow the manufacturing error in the distance L, while maintaining the liquid tight seal between the ports 87*c* and 78*c*.

Figure 4:
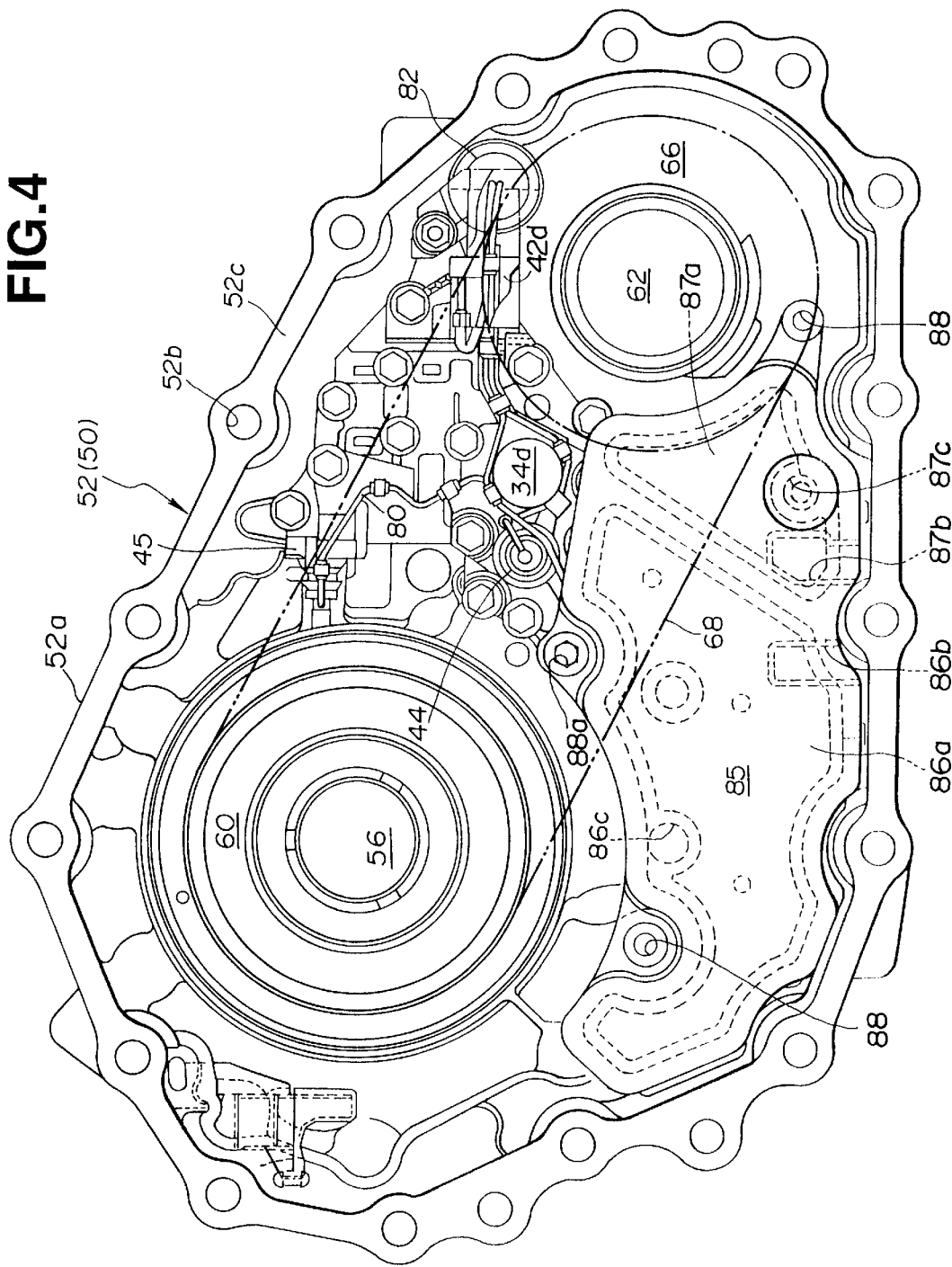
FIG. 4 is a view similar to FIG. 3 with a baffle plate removed to show an oil strainer unit.
Figure 8:
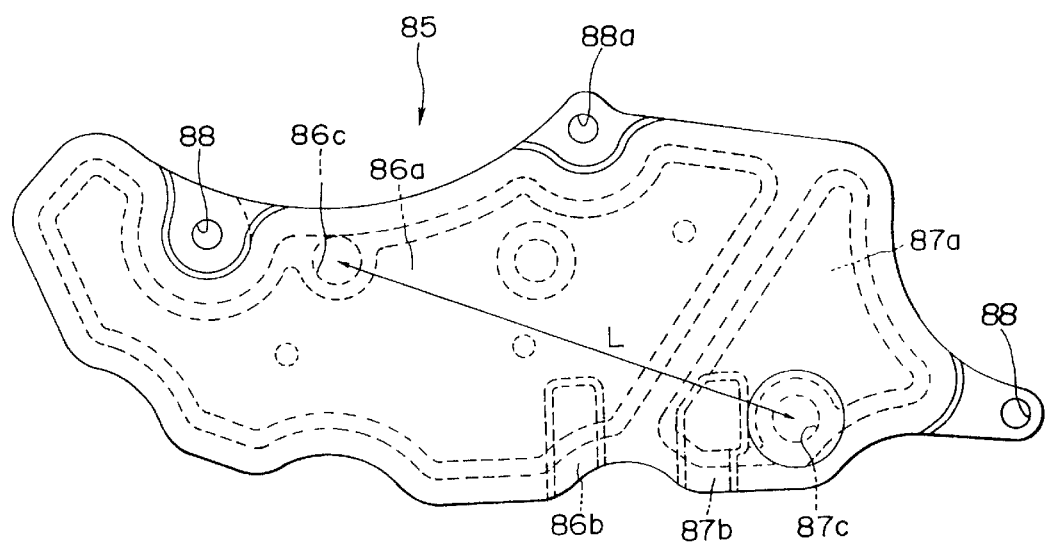
FIG. 8 is a top plan view of the oil strainer unit.
Figure 7:
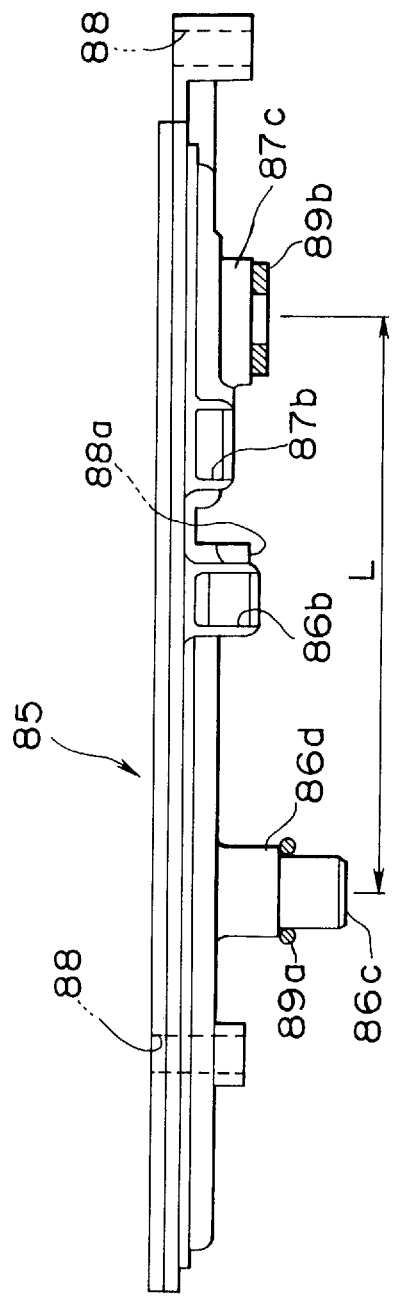
FIG. 7 is a side view of the oil strainer unit.
Figure 9:
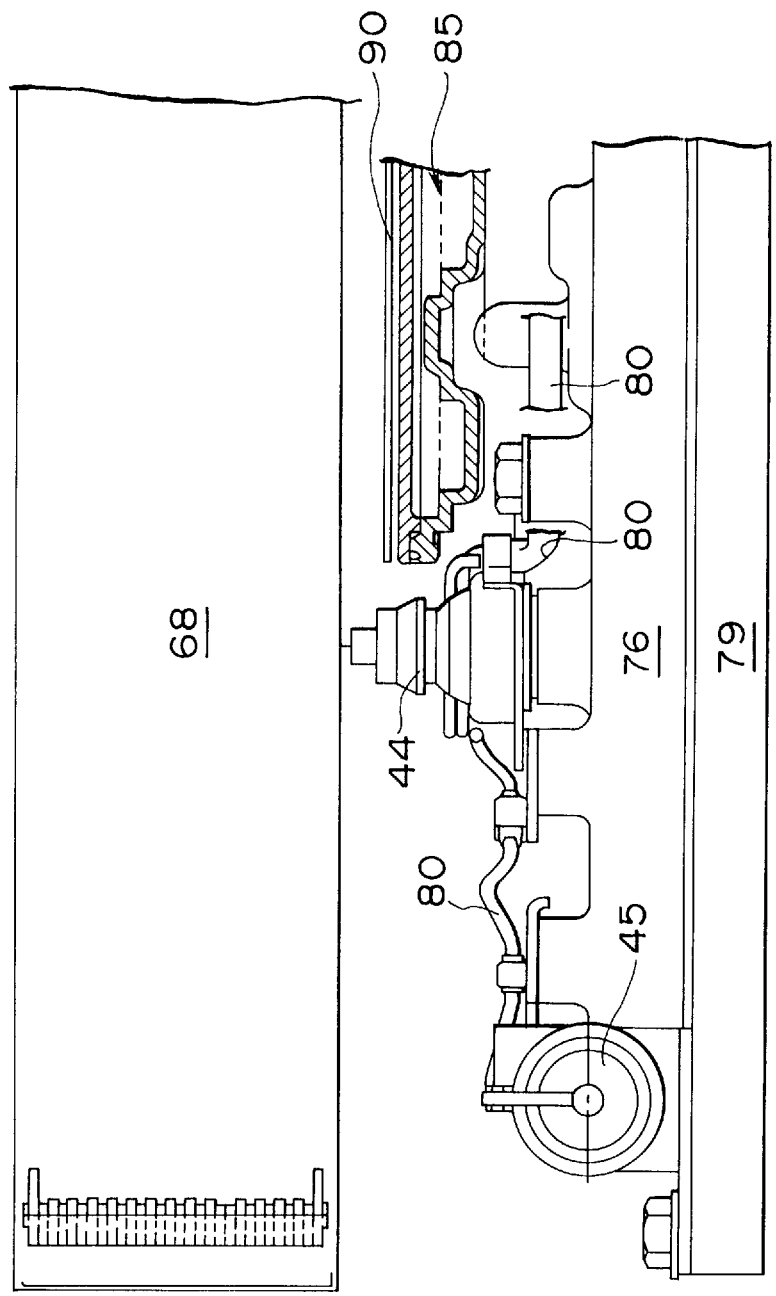
FIG. 9 is a fragmentary view illustrating the arrangement including a valve assembly including the valve body, the oil strainer, the baffle plate, and a power transmission chain.

Referring to FIGS. 7 and 8, the strainer unit 85 has two separated filter chambers 86*a* and 87*a*. The ports 86*c* and 87*c* are open to the filter chambers 86*a* and 87*a*, respectively. The strainer unit 85 also has ports 86*b* and 87*b* opening to the filter chambers 86*a* and 87*a*, respectively. In the installed position as illustrated in FIG. 4, the ports 86*b* and 87*b* are immersed in oil contained in the transfer casing 50.

As is readily seen from FIGS. 3–5 and 9, the baffle plate 90 is disposed between the chain 68 and the valve body 76 and extends to cover the strainer unit 85. The baffle plate 90 and the strainer unit 85 prevent interference between a harness 80 and the chain 68, thus protecting the harness 80. The strainer unit 85 and baffle plate 90 are disposed within a body of oil, suppressing surface variations and creation of bubbles which otherwise would occur during movement of the chain 68 through the body of oil.

In operation of the main pump 20 during forward travel of the motor vehicle, oil is drawn into the filter chamber 86a via the port 86b and then toward the main pump 20 via the ports 86c and 57. Oil discharged by the pump 20 is supplied to an oil element 26 (see FIG. 2) via supply or inflow passages 95a (see FIG. 10).

Figure 10:
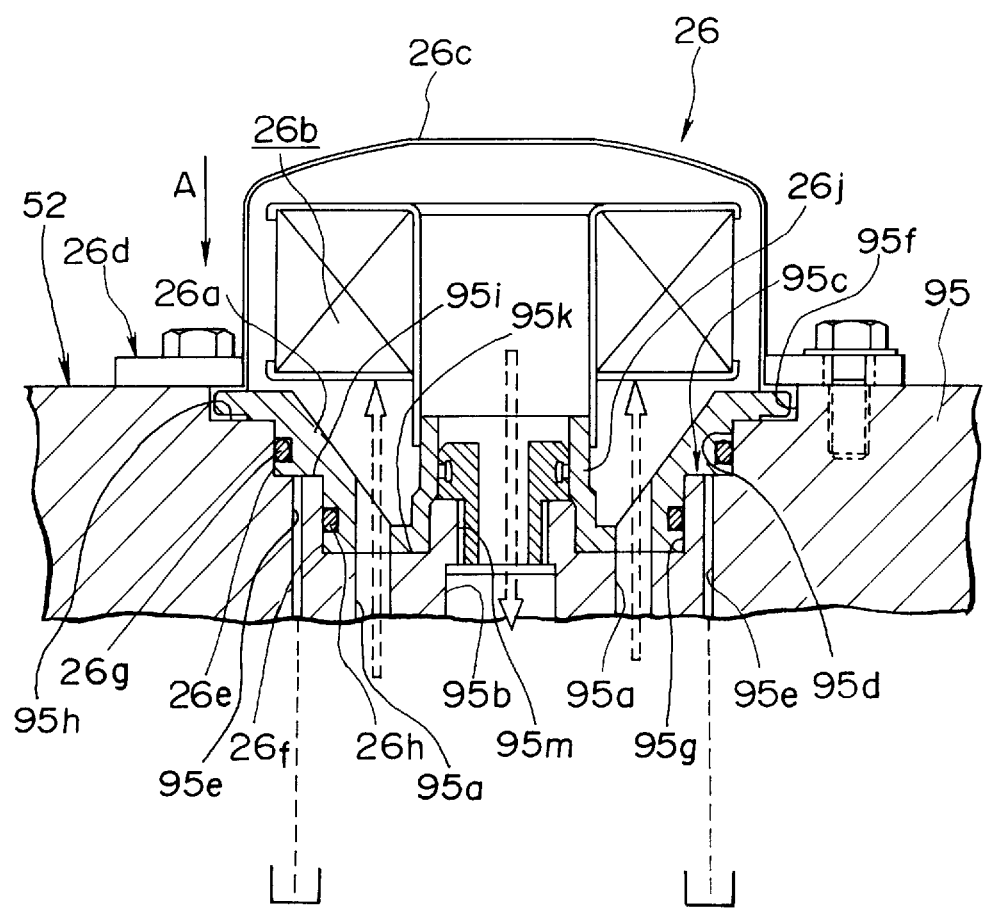
FIG. 10 is a fragmentary sectional view showing an oil element.

FIG. 10 shows a portion 95 of the rear casing 52 where the oil element 26 is mounted. The oil element 26 is attached to the rear casing 52 and projects therefrom as seen in FIG. 2. The oil element 26 includes a cup-shaped cover 26c having an opening surrounded by an annular flange 26d which is seated against the portion 95 of the rear casing 52 and fixedly held thereto by means of a plurality of bolts. The portion 95 is formed with a circular recess and has a wall 95c defining the circular recess. The wall 95c defining the circular recess includes concentric cylindrical wall sections 95f, 95d, and 95g, two annular shoulder sections 95h and 95i, and a bottom section 95k. Specifically, the cylindrical wall sections 95f and 95d are interconnected by the annular shoulder section 95h, the cylindrical wall sections 95d and 95g are interconnected by the annular shoulder section 95i, and the cylindrical wall 95g is connected with the bottom section 95k. Fixedly attached to an open end of the cup-shaped cover 26c is an annular coupling 26a. Disposed within the cover 26c is an oil filter 26b fixed to the coupling 26a. The portion 95 of the rear casing 52 is formed with a plurality of inflow passages 95a having one ends thereof communicating with the main and auxiliary pumps 20 and 24 to receive oil discharged thereby. The inflow passages 95a terminate in openings within the bottom section 95k. The portion 95 is formed also with an outflow passage 95b emanating from a central opening which is disposed within the bottom section 95k and supported by the openings with which the inflow passages terminate in. The bottom section 95k is elevated at its center portion to form a cylindrical protrusion 95m surrounding the central opening which the outflow passage 95b emanates from. The coupling 26a and the annular recess defining wall 95c define therebetween a clearance through which oil may pass toward the outside of the rear casing 52. In order to prevent leak of oil through this clearance, the coupling 26a is formed with two grooves receiving therein O-rings 26g and 26h, respectively. The O-ring 26g is in engagement with the cylindrical wall section 95d, while the O-ring 26h is in engagement with the cylindrical wall section 95g. In other words, the O-rings 26g and 26h are in engagement with the recess defining wall 95c at different locations of the clearance to define a fluid space between the coupling 26a, recess defining wall 95c, and O-rings 26g and 26h. The portion 95 of the rear casing 52 is formed with at least one, two in this embodiment, drain passage 95e having an opening disposed within the annular shoulder section 95i to communicate with the fluid space defined between the coupling 26a, recess defining wall 95c, and O-rings 26g and 26h. In order to prevent oil from flowing to the outflow passage 95b bypassing the oil filter 26b, the coupling 26a has a central cylindrical protrusion 26j fixedly coupled with the oil filter 26b. Coupled with the cylindrical protrusion 26j is the cylindrical protrusion 95m of the portion 95 of the rear casing 52. The coupling 26a is formed with passages aligned with the inflow passages 95a, respectively.

During supply of oil discharged by the main pump 20 and or the auxiliary pump 24 to the inside of the oil element 26, the cup-shaped cover 26c is subject to a force tending to separate the oil element 26 from the recess defining wall 95c owing to the pressure of the discharged oil. In the excessive case, the clearance defined between the coupling 26a and the recess defining wall 95c is widened. Via this widened clearance, oil tends to escape toward the outside of the rear casing 52. However, this tendency is reduced by the provision of the O-rings 26g and 26h and leak of oil to the outside of the rear casing 52 is prevented by discharging oil which has entered the space past the O-ring 26h via the drain passages 95e.

During operation of the main pump 20 and or the auxiliary pump 24, oil having passed through the oil filter 26b is supplied via the outflow passage 95b to the valve body 76 of the valve assembly 73 of the actuator 4.

Figure 11:
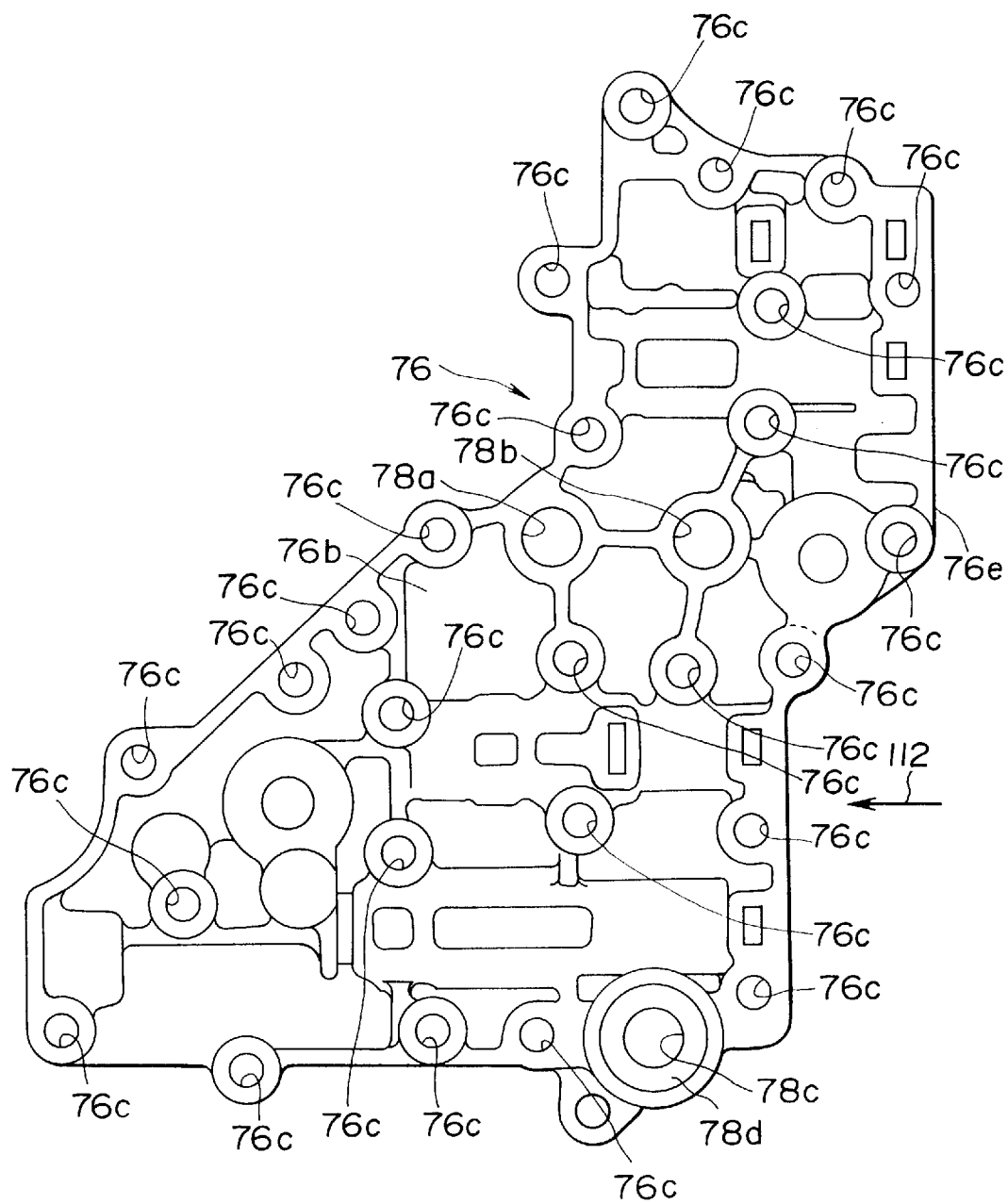
FIG. 11 is a top plan view of the valve body.
Figure 12:
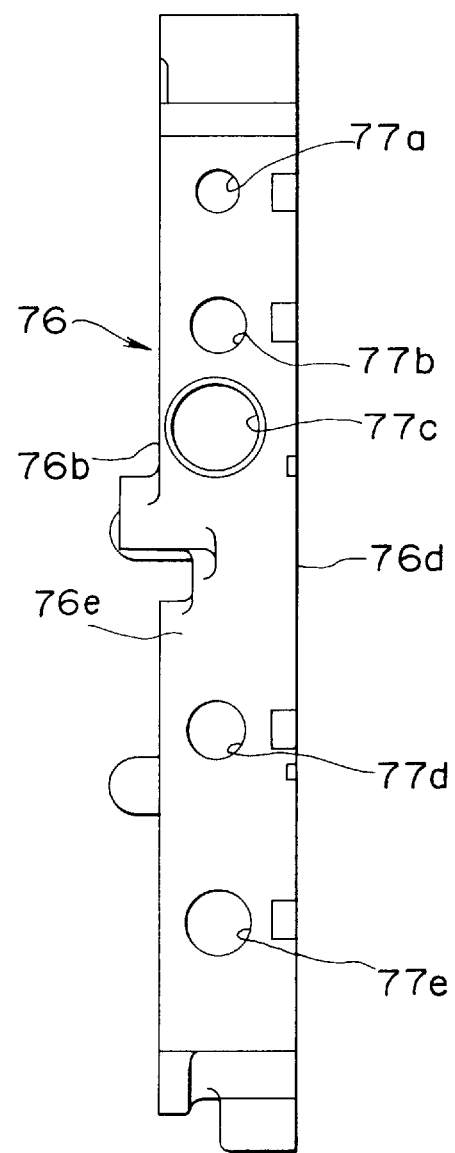
FIG. 12 is a side view viewing the valve body of FIG. 11 in a direction as indicated by an arrow 112.

FIG. 11 shows a top plan view of the valve body 76 and FIG. 12 is a side view of the valve body 76 viewing FIG. 11 in a direction as indicated by an arrow 112. The valve body 76 has a flat bottom face 76d adapted to engage the seating 79 (see FIG. 2), and a top face 76b. The top and bottom faces 76b and 76d are interconnected by a peripheral wall having a plurality of sides including a side 76e as best seen in FIG. 12. Comparing FIG. 11 with FIG. 5, it is readily seen that the valve body 76c is formed with a number of bolt holes 76 for receiving the bolts 76a. It is also seen in FIG. 11 that there is a hole 78a at which a pressure switch 44 is mounted and another hole 78b which receives a valve spool of a solenoid operated valve 34 including a mode selector solenoid 34d. As readily seen from FIG. 5, the pressure switch 44 and the mode selector solenoid 34d are disposed within an area defined between the sprockets 60, 66 and chain 68 and project from the top face 76b of the valve body 76 toward the chain 68 (see FIG. 9 also). An oil temperature sensor 43 is attached to the top face 76b of the valve body 76 and immersed in the body of oil contained in the casing 50. Attached to the peripheral wall of the valve body 76 are a pressure switch 45 and a clutch activating pressure solenoid 42d.

Figure 13:
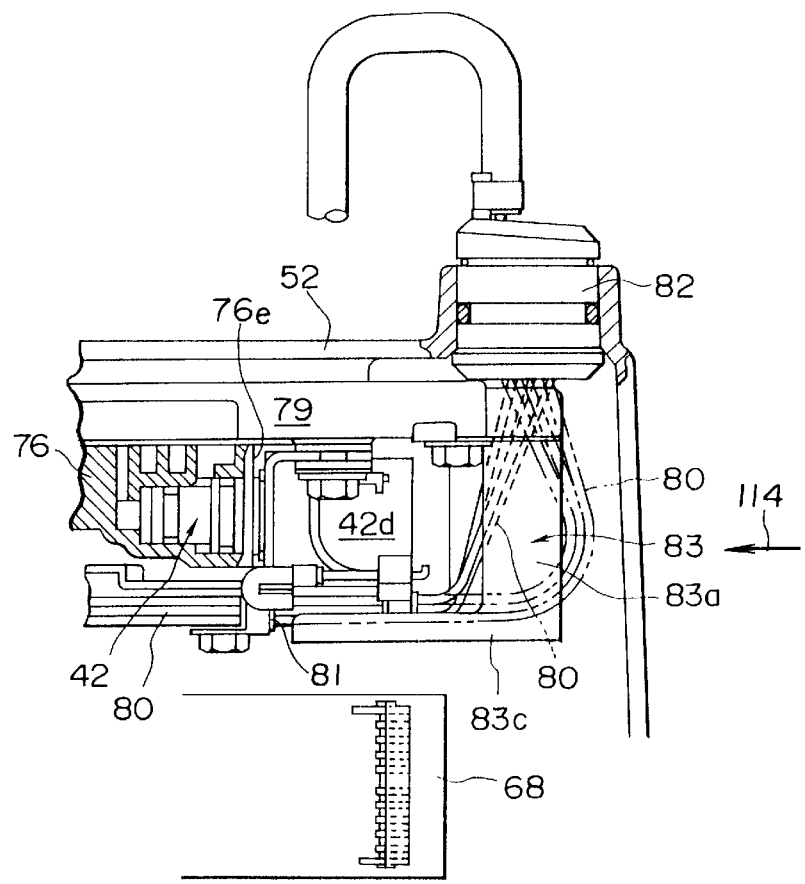
FIG. 13 is a fragmentary view showing a terminal of a harness, a harness cover, a clutch activating pressure solenoid and the power transmission chain.

As seen in FIG. 5, the oil temperature sensor 43, and pressure switches 44 and 45 are electrically connected with the control unit 5, while the solenoids 34d and 42d are electrically connected to the control unit 5. Since the control unit 5 is disposed outside of the casing 50, the harness 80 establishes the electrical connections. As best seen in FIG. 13, the harness 80 from the control unit 5 enters the inside of the casing 50 through a plug 82 fixedly received in a port opening formed in rear casing 52. As readily seen from FIGS. 13 and 14, a harness over 83 is attached to the seating 79 and located adjacent the plug 82 to receive the harness 80. The harness over 83 includes two parallel walls 83a and 83b extending from the seating 79 toward the chain 68 and interconnected by an end wall 83c which extends parallel to and in spaced relationship with the chain 68. The harness 80 extends through a space between the two parallel walls 83a and 83b and along the end wall 83c toward the clutch activating pressure solenoid 42d, mode selector solenoid 34d, pressure switches 44 and 45, and oil temperature sensor 43. The harness 80 is fixedly attached to the top face 76b of the valve body 76 by a plurality of fasteners.

Figure 14:
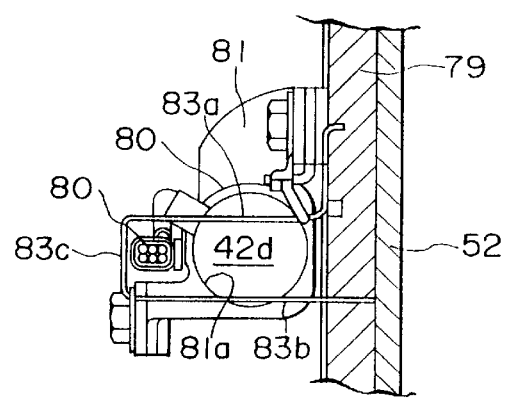
FIG. 14 is a section viewing FIG. 13 in a direction as indicated by an arrow 114.

Referring to FIG. 12, the valve body 76 is formed with bores 77a, 77b, 77c, 77d and 77e cut inwardly from the side 76e. The bore 77a receives a valve spool of a mode selector valve 40. The bore 77b receives a valve spool of a clutch activating pressure regulator valve 36. The bore 77c receives a valve spool of a booster valve 42 including the clutch activating pressure solenoid 42d (see FIG. 13 also). The bore 77d receives a valve spool of a pilot valve 38. The bore 77e receives a line or system pressure regulator valve 32. As best seen in FIGS. 13 and 14, a plate 81 is fixedly bolted to the seating 79 and has a portion extending toward the chain 68. This portion of the plate 81 is formed with an aperture 81a (see FIG. 14) receiving the clutch activating pressure solenoid 42d to hold same in the illustrated position in FIGS. 13 and 14.

The above-mentioned valves, namely, the line pressure regulator valve 32, solenoid operated valve 34 with the mode selector solenoid 34d, clutch activating pressure regulator valve 36, pilot valve 38, mode selector valve 40 and booster valve 42, and the valve body 76 form a hydraulic circuit fluidly disposed between the oil element 26 and the VTT clutch 58. The hydraulic circuit is shown in FIG. 15 together with the main and auxiliary pumps 20 and 24, oil temperature sensor 43, pressure switches 44 and 45, and control unit 5.

Figure 15:
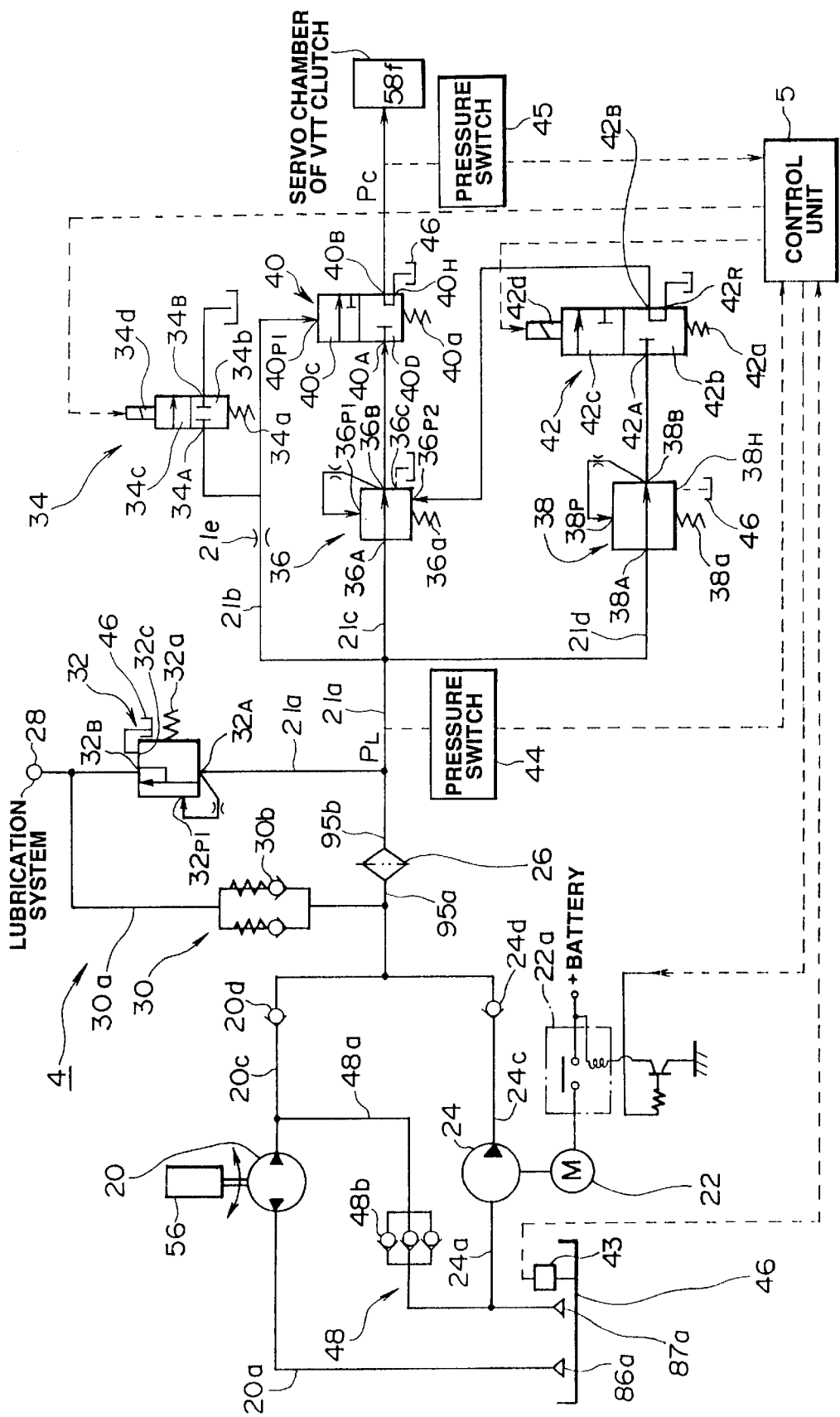
FIG. 15 is a hydraulic circuit of an actuator.

Referring to FIG. 15, the oil tank which is defined within the casing 50 is indicated by the reference numeral 46. The enter drive shaft 56 is shown at a block and drivingly connected to the main pump 20. During forward travel of the motor vehicle, the enter drive shaft 56 is rotated in a forward direction, turning a rotor of the main pump 20 in the forward direction. During reverse travel of the motor vehicle, the enter drive shaft 56 is rotated is a reverse direction, turning the rotor of the main pump 20 in the reverse direction. During forward travel of the motor vehicle, the main pump 20 has a suction side connected to the filter chamber 86a of the oil strainer unit 85 through a passage 20a and a discharge side connected to the inflow passage 95a of the oil element 26 through a passage 20c and a one-way check valve 20d. Owing to the provision of the check valve 20d, reverse flow of oil from the inflow passage 95a to the passage 20c is blocked. The auxiliary pump 24 is put in operation when electric current passes through the motor 22 in response to losing of a normally open relay 22a. The normally open relay 22a is closed when a motor activating signal is supplied thereto from the control unit 5. When in operation, the auxiliary pump 24 has a suction side connected to the filter chamber 87a of the strainer unit 85 through a passage 24a and a discharge side connected to the inflow passage 95a of the oil element 26 through a passage 24c and a one-way check valve 24d. Owing to the provision of the check valve 24d, reverse flow of oil from the inflow passage 95a to the passage 24c is blocked.

In order to allow smooth turning of the rotor of the main pump 20 during the reverse travel of the motor vehicle, a one-way bypass path 48 is provided. The one-way bypass path 48 has one end connected to the filter chamber 87a of the strainer unit 85 and an opposite end connected to the passage 20c. The bypass path 48 includes a passage 48a and three one-way check valves 48b connected in parallel. When the rotor of the main pump 20 turns in the reverse direction, the main pump 20 draws oil from the oil tank 46 through the filter chamber 87a, bypass path 48 and passage 20c, and discharges oil to the tank 46 through the passage 20a and filter chamber 86a. It is now appreciated that, during this operation of the main pump 20, negative pressure build-up within the passage 20c is avoided owing to the provision of the one-way bypass path 48, resulting in a reduction in load imposed on the enter drive shaft 56 drivingly connected with the main pump 20.

In order to remove foreign matters, such as refuse and rust, entrained in the discharged oil, the oil is forced to pass through the oil filter 26b (see FIG. 10) of the oil element 26. The oil filter 26b catches foreign matters so that after a long use the foreign matters deposited on the oil filter 26b cause a reduction in effective flow area of the oil filter 26. Thus, there occurs an increase in pressure at a portion directly communicating with the inflow passage 95a owing to the reduced flow area of the oil filter 26b. When, owing to this increase in pressure, the pressure at this portion reaches a predetermined value, pressure responsive spring biased relief valve assembly 30b of a pressure relief path 30 is opened to allow escape of oil. The escaped oil passes through a passage 30a toward a lubrication system 28 where oil is distributed between portions to be lubricated. In this manner, excessive pressure increase on the inflow side of the oil element 26 is prevented owing to the provision of the relief path 30.

The outflow passages 95b of the oil element 26 communicate with or merge into a line pressure passage 21a. The line pressure regulator valve 32 is fluidly connected between the line pressure passage 21a and the lubrication system 28. The pressure regulator valve 32 includes a valve bore formed with a port 32A communicating with the line pressure passage 21a, a port 32B communicating with the lubrication system 28, a drain port 32C, and a feedback port 32P1 communicating via an orifice with the port 32A. The pressure regulator valve 32 includes a spool which is subject to a first force owing to a spring 32a and a second force, opposed to the first force, proportional to pressure at the port 32P1. The spool is slidably disposed in the valve bore. An increase in pressure at the port 32P1 above a predetermined pressure value that is determined by the force of the spring 32a moves the spool against the spring 32a to a position where the port 32B and 32C are uncovered to communicate with the port 32A to allow discharge of oil toward the lubrication system and the oil tank 46, resulting in a drop in pressure at the port 32A. If there is a decrease in pressure at the port 32P1 below the predetermined pressure value, the spring 32a moves the spool to a position where the port 32B and 32C are covered to block discharge of oil, causing an increase in pressure toward the predetermined pressure value. In this manner, the regulator valve 32 effects pressure regulation to provide the line pressure PL to the passage 21a. The line pressure PL is held as high as the predetermined pressure value determined by the spring 32a provided oil is supplied from the oil element 26 to the passage 21a at a sufficiently high rate.

The line pressure passage 21a splits into a plurality of, three in this hydraulic circuit, branch passages 21b, 21c and 21d for distribution of the line pressure PL. The branch passage 21 extends to the clutch activating pressure regulator valve 36. This regulator valve 36 includes a valve bore formed with an inlet port 36A communicating with the branch passage 21c, an outlet port 36B, a drain port 36C, a feedback port 36P1 communicating via an orifice with the outlet port 36B, and a signal pressure port 36P2 fluidly connected to the booster valve 42. The regulator valve 36 further includes a spool slidably disposed in the valve bore thereof and a spring 36a. When no pressure is supplied to the signal pressure port 36P2, the spool is subject to a first force owing to the spring 36a and a second force, opposed to the first force, proportional to pressure at the feedback port 36P1. When it is in a spring set position, the spool allows fluid communication between the inlet and outlet ports 36A and 36B. An increase in oil pressure at the outlet port 36B beyond a predetermined pressure value that is determined by the spring 36a, the spool moves to a position where the fluid communication between the inlet and outlet ports 36A and 36B is blocked and the drain port 36C is uncovered to communicate with the outlet port 36B, discharging a portion of oil via the drain port 36C and causing a drop in the oil pressure at the outlet port 36B. If this drop results in a decrease in pressure at the outlet port 36B below this predetermined pressure value, the spring 36a moves the spool to a position where the fluid communication between the inlet and outlet ports 36A and 36B is established and the drain port 36C is covered, causing an increase in pressure toward the predetermined pressure value determined by the spring 36a. In this manner, the clutch activating pressure regulator valve 36 effects pressure regulation to provide a clutch activating pressure PC to the outlet port 36B. The clutch activating pressure PC is held as high as the predetermined pressure value determined by the spring 36a.

When there is a pressure supplied to the signal pressure port 36P2, a force assisting the action of the spring 36a is applied to the spool of the clutch activating pressure regulator valve 36. This causes an increase in the predetermined pressure value and thus an increase in the clutch activating pressure PC at the outlet port 36B. The magnitude of pressure supplied to the signal pressure port 36P2 is continuously varied by the solenoid operated booster valve 42.

The branch passage 21d extends to the pilot valve 38. The pilot valve 38 is a regulator valve which includes a valve bore formed with an inlet port 38A communicating with the branch passage 21d, an outlet port 38B, a feedback port 38P communicating via an orifice with the outlet port 38B, and a drain port 38H. The pilot valve 38 includes a spool slidably disposed in the valve bore thereof and a spring 38a. The spool is subject to a first force owing to the spring 38a and a second force, opposed to the first force, proportional to pressure at the feedback port 38P. When it is in a spring set position, the spool allows fluid communication between the inlet and outlet ports 38A and 38B. An increase in oil pressure at the feedback port 38P beyond a predetermined pressure value that is determined by the spring 38a, the spool moves to a position where the fluid communication between the inlet and outlet ports 38A and 38B is blocked and the drain port 38H is uncovered to communicate with the outlet port 38B, discharging a portion of oil via the drain port 38H and causing a drop in the oil pressure at the outlet port 38B. If this drop results in a decrease in pressure at the outlet port 38B below this predetermined pressure value, the spring 38a moves the spool to a position where the fluid communication between the inlet and outlet ports 38A and 38B is established and the drain port 38H is covered, causing an increase in pressure toward the predetermined pressure value determined by the spring 38a. In this manner, the pilot valve 38 effects pressure regulation to provide a pilot pressure to the outlet port 36B. The pilot pressure is held as high as the predetermined pressure value determined by the spring 38a and remains invariable.

The pilot pressure is supplied to the solenoid operated booster valve 42 including the clutch activating pressure solenoid 42d. This solenoid operated valve 42 has three ports, namely an inlet port 42A communicating with the outlet port 38B of the pilot valve 38, an outlet port 42B communicating with the signal pressure port 36P2 of the clutch activating pressure regulator valve 36, and a drain port 42R. Upon deenergization or deactivation of the clutch activating pressure solenoid 42d, the valve 42 takes a closed position 42b set by a spring 42a. In this closed position 42b, the inlet port 42A is covered, while the drain port 42R is uncovered to communicate with the outlet port 42B. Energization or activation of the solenoid 42d causes a shift from the closed position 42b to an open position 42c. In the open position 42c, the inlet port 42A is uncovered to communicate with the outlet port 42B, while the drain port 42R is covered. When the solenoid 42d continues to be energized, the pressure at the outlt port 42B is held as high as the pilot pressure. When the solenoid 42d continues to be deenergized, no pressure prevails at the outlet port 42B. When the solenoid 42d is energized and deenergized within a unit time and this cycle is repeated, the pressure provided to the outlet port 42B is determined as a function of a ratio of time when the solenoid is energized to the unit time. This ratio, which is called duty ratio, is continuously variable from 0% to 100%. The duty ratio is determined by the control unit 5. Thus, the magnitude of pressure supplied to the signal pressure port 36P2 an be varied by varying the duty ratio. This means that the magnitude of the clutch activating pressure PC is variable with the duty ratio determined by the control unit 5.

From the preceding description of the hydraulic circuit, it will be appreciated that the line pressure regulator valve 32, main pump 20 and auxiliary pump 24 cooperate with each other to form means for generating the line (or system) hydraulic fluid pressure.

It will also be appreciated that the clutch activating pressure regulator valve 36, pilot valve 38 and solenoid operated booster valve 42 cooperate with each other to form means for generating the clutch activating hydraulic fluid pressure PC.

Figure 16:
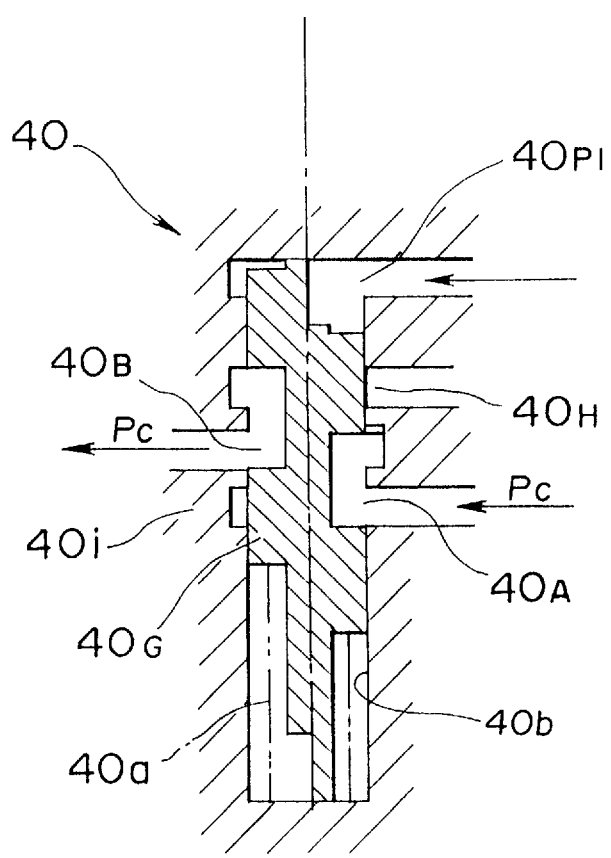
FIG. 16 is a diagram of a two-position mode selector valve used in FIG. 15.

For transmitting the clutch activating fluid pressure PC to the servo chamber 58f of the VTT clutch 58, the two-position mode selector valve 40 is fluidly disposed between the clutch activating pressure regulator valve 36 and the servo chamber 58f. Referring also to FIG. 16, the mode selector valve 40 includes a valve bore 40b formed with an inlet port 40A communicating with the outlet port 36B of the clutch activating pressure regulator valve 36, an outlet port 40B communicating with the servo chamber 58f of the VTT clutch 58, a drain port 40H, and a signal pressure port 40P1. The mode selector valve 40 further includes a spool 40G slidably disposed in the valve bore 40b and a spring 40a. When there is no pressure supplied to the signal pressure port 40P1, the mode selector valve 40 takes a two-wheel drive (2WD) mode position 40D (see FIG. 15), set by the spring 40a, as illustrated by a left half of the spool 40G in FIG. 16. In this spring set 2WD mode position 40D, the inlet port 40A is covered and the drain port 40H is uncovered to communicate with the outlet port 40B, allowing discharge of oil from the servo chamber 58f to the drain port 40H. This results in disengagement of the VTT clutch 58. When the pressure supplied to signal pressure port 40P1 exceeds a predetermined value, the spool 40G moves against the spring 40a and the valve 40 takes a four-wheel drive (4WD) mode position 40C (see FIG. 15) as illustrated by a right half of the spool 40G in FIG. 16. In the 4WD mode position 40C, the inlet port 40A is uncovered to communicate with the outlet port 40B and the drain port 40H is covered, allowing transmission of the clutch activating pressure PC to the servo chamber 58f of the VTT clutch 58. This results in engagement of the VTT clutch 58. The degree of engagement of the VTT clutch 58 is variable with the magnitude of the clutch activating pressure PC. Thus, the magnitude of torque transmitted through the VTT clutch 58 is variable with the magnitude of the clutch activating pressure PC that an be varied by varying the duty ratio of the clutch activating pressure solenoid 42d.

The signal pressure port 40P1 communicates via an orifice 21e with the branch passage 21b. The pressure supplied to the signal pressure port 40P1 is shiftable from zero level to a pressure level as high as the line pressure PL and vie versa under the control of the solenoid operated valve 34 including the mode selector solenoid 34*d*. The solenoid operated valve 34 has two ports, namely, an inlet port 34A and a drain port 34B. The inlet port 34A communicates with a portion fluidly disposed between the orifice 21*e* and the signal pressure port 40P1. Upon deenergization or deactivation of the mode selector solenoid 34*d*, the solenoid valve 34 takes a closed position 34*b* set by a spring 34*a*. In this closed position 34*b*, the inlet port 34A is covered, allowing transmission of the line pressure PL from the branch passage 21*b* to the signal pressure port 40P1 of the mode selector valve 40. Energization or activation of the mode selector solenoid 34*d* causes a shift from the closed position 34*b* to an open position 34*c*. In this open position 34*c*, the inlet port 34A is uncovered to communicate with the drain port 34B, allowing discharge of oil from the signal pressure port 40P1, causing the pressure at the signal pressure port 40P1 to drop toward zero.

From the preceding description, it will be noted that the line pressure PL is supplied to the signal pressure port 40P1 upon deactivation of the mode selector solenoid 34*d*, while no pressure is supplied to the signal pressure port 40P1 upon activation of the mode selector solenoid 34*d*. Thus, if the line pressure PL is sufficiently high enough to exceed the predetermined value determined by the spring 40*a*, deactivation of the mode selector solenoid 34*d* causes the mode selector valve 40 to shift to the 4WD mode position 40C, causing application of the clutch activating pressure PC to the servo chamber 58*f* of the VTT clutch 58. When no pressure is supplied to the signal pressure port 40P1 upon activation of the mode selector solenoid 34*d*, the spring 40*a* sets the mode selector valve 40 at the 2WD mode position 40D.

As shown in FIG. 15, the pressure switch 44 is arranged to detect the magnitude of pressure PL prevailing in the line pressure passage 21*a*, while the pressure switch 45 is arranged to detect the magnitude of pressure PC supplied from the mode selector valve 40 to the servo chamber 58*f* of the VTT clutch 58. The state of the pressure switch 44 is supplied to the control unit 5. Similarly, the state of the pressure switch 45 is supplied to the control unit 5. Also shown in FIG. 15 is the oil temperature sensor 43 which is immersed into the oil in the tank 46 to detect temperature of the oil. This sensor 43 provides an electrical signal representative of the detected temperature to the control unit 5.

It will now be appreciated from the preceding description that the mode selector valve 40, orifice 21*e* and solenoid operated valve 34 including the mode selector solenoid 34*d* cooperate with each other to form means for transmitting the clutch activating fluid pressure to the VTT clutch 58.

An alternative form of means for transmitting the clutch activating fluid pressure PC to the VTT clutch 58 is explained in connection with FIGS. 17 and 18.

Figure 17:
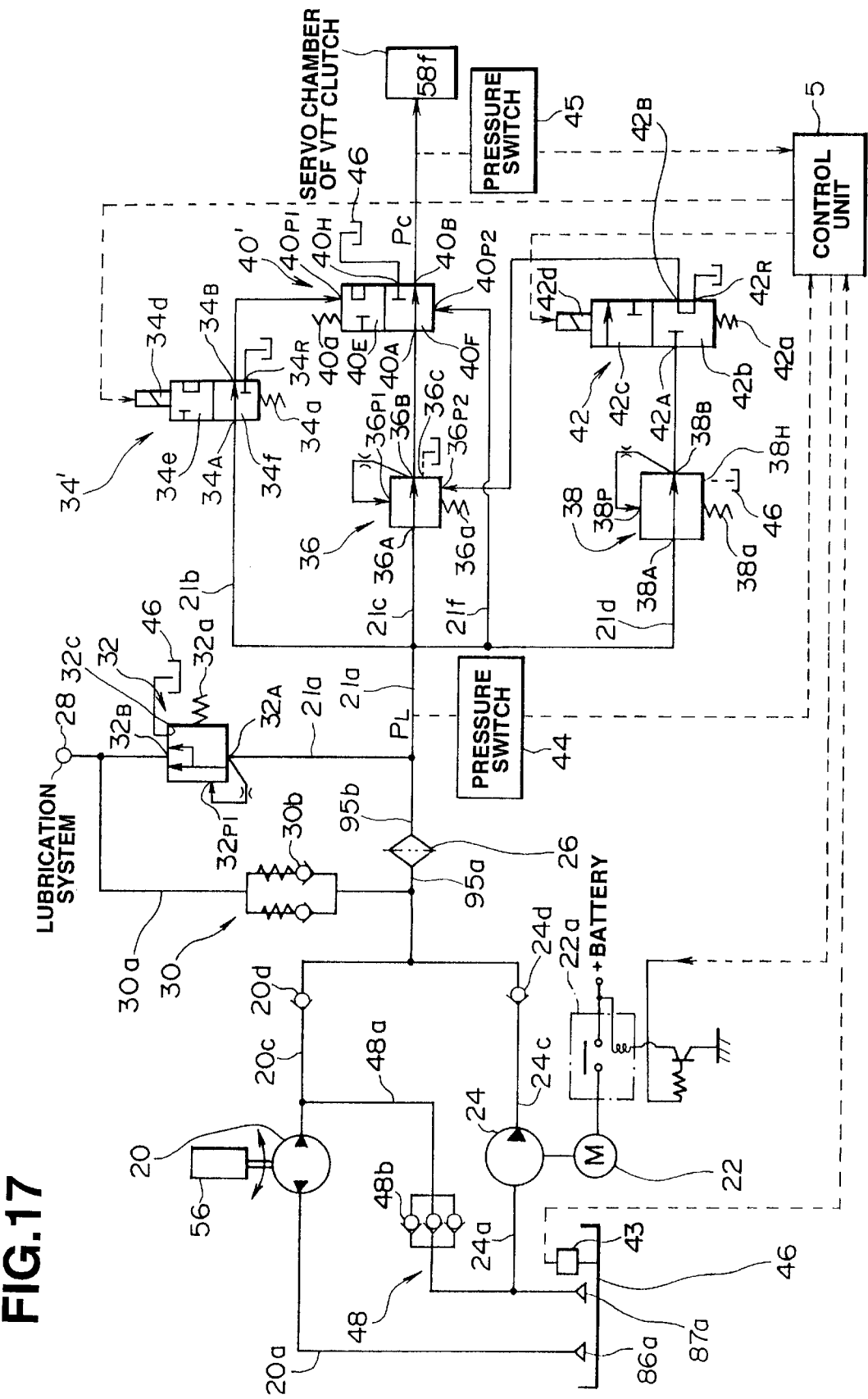
FIG. 17 is a similar view to FIG. 15 illustrating an alternative form of the actuator.

FIG. 17 is substantially the same as FIG. 15 except the provision of a mode selector valve 40' and a solenoid operated valve 34' in place of the mode selector valve 40, the solenoid operated valve 34 and orifice 21*e* shown in FIG. 15.

Figure 18:
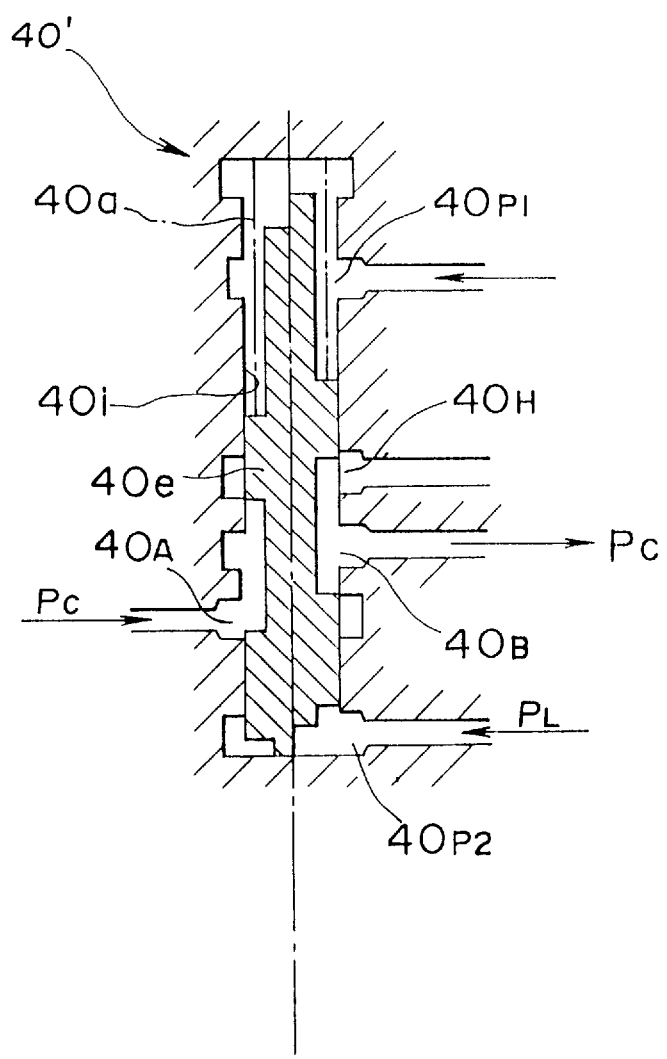
FIG. 18 is a diagram of alternative form of a two-position mode selector valve used in FIG. 17.

Referring also to FIG. 18, the mode selector valve 40' includes a valve bore 40*i* formed with an inlet port 40A communicating with an outlet port 36B of a clutch activating pressure regulator valve 36, an outlet port 40B communicating with a servo chamber 58*f* of a VTT clutch 58, a drain port 40H, a first signal pressure port 40P1 and a second signal pressure port 40P2 communicating with a branch passage 21*f* of a line pressure passage 21*a*. The mode selector valve 40' includes a spool 40*e* slidably disposed in the valve bore 40*i* and a spring 40*a*. When there is no pressure supplied to the first signal pressure port 40P1, the spool 40*e* is urged against the spring 40*a* by a line pressure PL supplied to the second signal pressure port 40P2 to a position as illustrated by a right half thereof in FIG. 18, causing the valve 40' to take a 2WD mode position 40E. In this 2WD mode position 40E, the inlet port 40A is covered and the drain port 40H is uncovered to communicate with the outlet port 40B, allowing discharge of oil from the servo chamber 58*f* to the drain port 40H. This results in disengagement of the VTT clutch 58. When the line pressure PL is supplied to the first signal pressure port 40P1, the spool 40*e* moves to a position as illustrated by a left half thereof in FIG. 18 owing to the spring 40*a* and the line pressure PL supplied to the first signal pressure port 40Pl. Thus, the valve 40' takes a 4WD mode position 40F. In this 4WD mode position 40F, the drain port 40H is covered and the inlet port 40A is uncovered to communicate with the outlet port 40B, allowing transmission of a clutch activating pressure PC to the servo chamber 58*f* of the VTT clutch 58. This results in engagement of the VTT clutch 58.

The pressure supplied to the first signal pressure port 40P1 is shiftable from zero level to a pressure level as high as the line pressure PL and vice versa under the control of the solenoid operated valve 34' including the mode selector solenoid 34*d*. The solenoid operated valve 34' has three ports, namely, an inlet port 34A, an outlet port 34B and a drain port 34R. The inlet port 40A communicates with a branch passsage 21*b* of the line pressure passage 21*a*. The outlet port 34B communicates with the first signal pressure port 40P1 of the mode selector valve 40'. Upon deenergization or deactivation of the mode selector solenoid 34*d*, the solenoid valve 34' takes an open position 34*f* set by a spring 34*a*. In this open position 34*f*, the drain port 34R is covered and the inlet port 30A is uncovered to communicate with the outlet port 34B, allowing transmission of the line pressure PL from the branch passage 21*b* to the first signal pressure port 40P1 of the mode selector valve 401. Energization or activation of the mode selector solenoid 34*d* causes a shift from the open position 34*f* to a closed position 34*e*. In this closed position 34*e*, the inlet port 34A is covered and the drain port 34R is uncovered to communicate with the outlet port 34B, allowing discharge of oil from the first signal pressure port 40P1, causing the pressure at the first signal pressure port 40P1 to drop toward zero.

From the preceding description in connection with FIGS. 17 and 18, it will be noted that the line pressure PL is supplied to the first signal pressure port 40P1 of the mode selector valve 40' upon deactivation of the mode selector solenoid 34*d*, while no pressure is supplied to the first signal pressure port 40P1 upon activation of the mode selector solenoid 34*d*. Thus, deactivation of the mode selector solenoid 34*d* causes the mode selector valve 40' to shift to the 4WD mode position 40F, causing application of the clutch activating pressure PC to the servo chamber 58*f* of the VTT clutch 58. When no pressure is supplied to the signal pressure port 40P1 upon activation of the mode selector solenoid 34*d*, the mode selector valve 40 takes the 2WD mode position 40E sine the line pressure PL is supplied to the port 40P2.

The same reference numerals have been used throughout FIGS. 15, 16, 17 and 18 to designate like or similar parts or portions for simplicity of description.

Referring back to FIG. 1, in addition to the oil temperature sensor 43, pressure switch 44 and pressure switch 45, there are provided a distance reorder 101, a vehicle speed sensor 102 and a 2WD–4WD mode sensor 103. The distance recorder 101 gives information as to distance travelled by the motor vehicle. The vehicle speed sensor 102 gives information as to vehicle speed derived from a vehicle speed meter of the motor vehicle. FIG. 2 shows a speed meter pinion 59b of the speed meter in meshing engagement with a gear 59a splined to the center shaft 56 for rotation therewith. The vehicle speed represented by the output of the vehicle speed sensor 102 is indicative of turning speed of the pinion 59b. The 2WD–4WD mode sensor gives information as to which one of 2WD or 4WD the motor vehicle should be conditioned in. The oil temperature sensor 43 gives a sensor output proportional to the detected temperature of oil. The pressure switch 44 is designed to be closed to give an output when the line pressure PL in the line pressure passage 21a exceeds a predetermined value. Similarly, the pressure switch 45 is designed to be closed to give an output when the clutch activating pressure PC transmitted from the mode selector valve 40 or 40' to the servo chamber 58f of the VTT clutch 58 exceeds a predetermined value.

In the hydraulic circuit shown in FIG. 15, when the line pressure PL supplied to the signal pressure port 40P1 of the mode selector valve 40 is kept as high as the predetermined pressure value determined by the spring 32a of the line pressure regulator valve 32 and thus sufficiently high enough to urge the spool 40G (see FIG. 16) against the spring 40a, the spool 40G is held at the 4WD mode position as illustrated by the right half thereof in FIG. 16, allowing supply of clutch activating pressure PC to the servo chamber 58f of the VTT clutch 58. In order to confirm whether the mode selector valve 40 shifts to the 4WD mode position 40C in response to supply of the line pressure PL to the signal pressure port 40P1, the control unit 5 executes a test routine as shown in FIG. 19.

Figure 19:
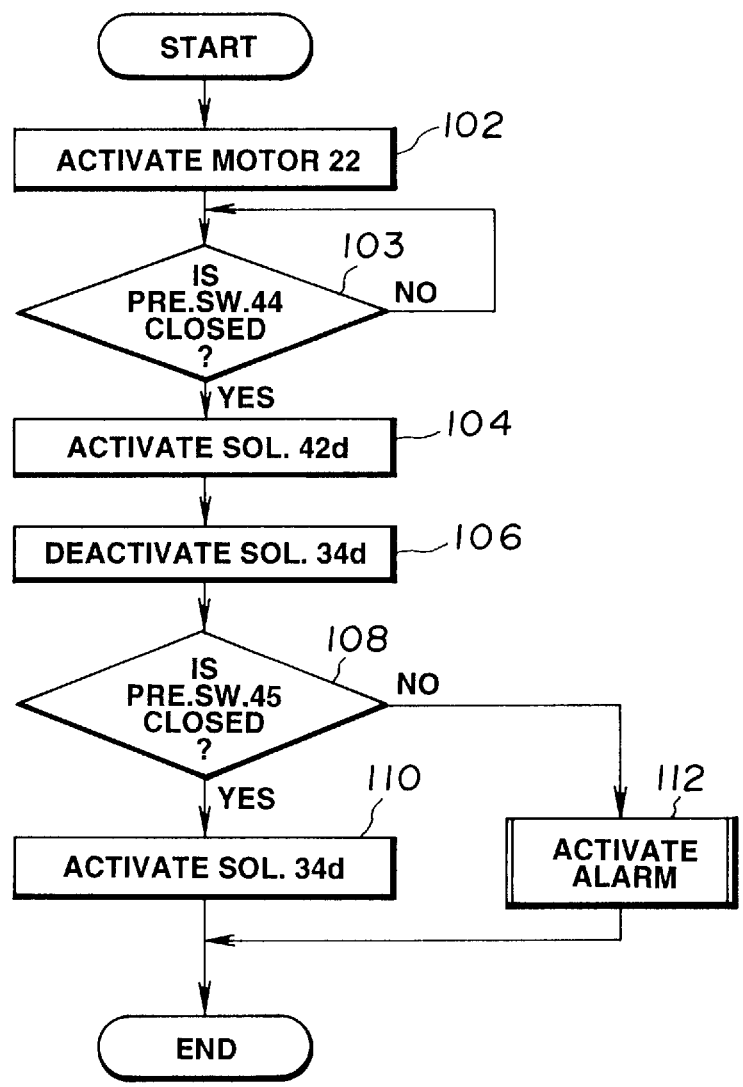
FIG. 19 is a flow diagram of a test routine.

Execution of the test routine shown in FIG. 19 is carried out by the control unit 5 immediately after the engine has started. In a block 102, the control unit 5 loses the relay 22a to activate the motor 22, causing the auxiliary pump 24 to discharge oil. In the next block 103, there is an interrogation whether the pressure switch 44 is closed. If there is a sufficient discharge of oil from the auxiliary pump 24 driven by the motor 22 and thus the line pressure PL becomes high enough to lose the pressure switch 44, the pressure switch 44 is closed, allowing the control to goes from the block 103 to a block 104. In the block 104, the control unit 5 sets 100% as duty ratio of the clutch activating pressure solenoid 42d to activate same. In other words, the solenoid 42d is kept energized. Then, the control goes to a block 106 where the mode selector solenoid 34d is deactivated to allow supply of the line pressure PL to the signal pressure port 40P1 of the mode selector vaslve 40. After the block 106, the control goes to a block 108. In the block 108, there is an interrogation whether the pressure switch 45 is closed. If there is supply of the clutch activating pressure PC from the mode selector valve 40 to the servo chamber 58f, the pressure switch 45 is closed and the test is considered to be passed. Thus, in this case, the control proceeds to a block 110 where the mode selector solenoid 34d is activated or energized to condition the mode selector valve 40 in the 2WD mode position 40D thereof.

If the pressure switch 45 is not closed at the interrogation in the block 108 and the test is considered to fail to be passed, the control proceeds to a block 112 where the control unit 5 activates an alarm circuit 100 (see FIG. 1).

Although execution of the routine shown in FIG. 19 has been described in connection with the hydraulic circuit shown in FIGS. 15 and 16, this test routine is equally applicable to the hydraulic circuit shown in FIGS. 17 and 18.

In FIG. 1, the control unit 5 repeats execution of a main routine wherein the mode selector solenoid 34d and the clutch activating pressure solenoid 42d are controlled to establish a torque split between the front wheels 2FR & 2FL and the rear wheels 2RR & 2RL. The torque split is varied according to a control strategy in order to achieve an ideal turning performance, an enhanced stability during straight forward running and an enhanced stability under braking. The control strategy is described on pages C-4 to C-20 of "Service Manual For Nissan Skyline (R33-2) F006733" issued by Nissan Motor Co. Ltd. in November 1993. Since this control strategy and the main routine are not a part of the invention, the detailed description is hereby omitted.

Figure 20:
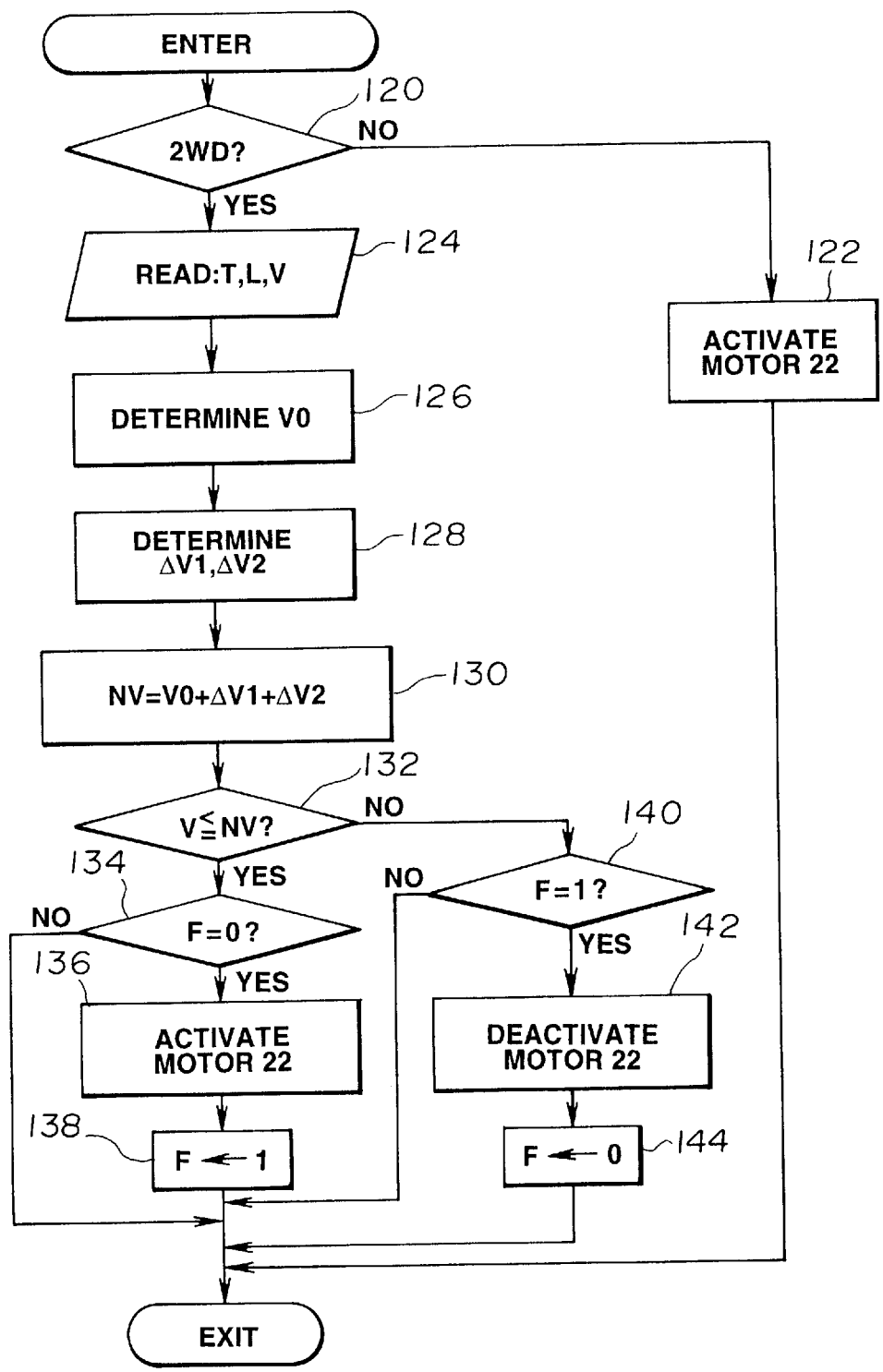
FIG. 20 is a flow diagram of a routine for controlling an auxiliary pump.
Figure 23:
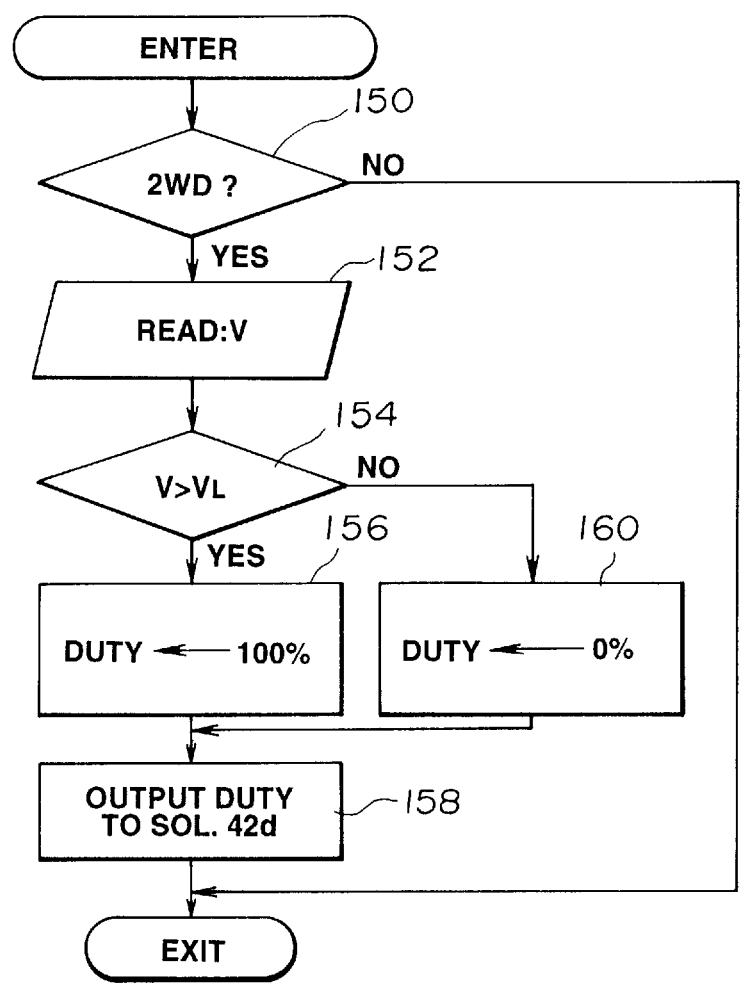
FIG. 23 is a flow diagram of a routine for controlling a clutch activating pressure during a two-wheel drive mode.

FIGS. 20 and 23 show sub-routines which are executed at regular intervals.

Figure 21:
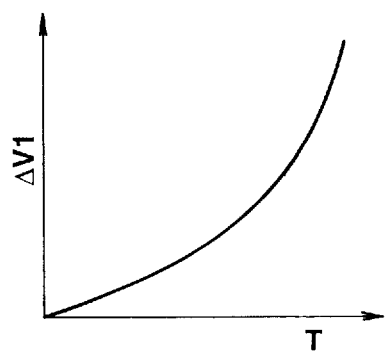
FIG. 21 is a graphical representation of a correction value variable dependent on detected oil temperature.

In a block 120 of FIG. 20, there is an interrogation whether the 2WD mode is instructed. This is recognized based on the output of 2WD–4WD mode sensor 103. If this is not the case, the control goes to a block 122 where the motor 22 is activated to cause the auxiliary pump 24 to discharge oil. If the interrogation in the block 120 results in affirmative (YES), the control goes to a block 124. In the block 124, reading operation is performed on the outputs of the oil tenmperature sensor 43, distance recorder 101 and vehicle speed sensor 102 to store the detected current temperature of oil as T, the detected current distance as L and the detected vehicle speed as V. Then, the control goes to a block 126 where a base reference speed value V0 is determined. The base value V0 may be, for example, 20 km/h. Then, the control goes from the block 126 to a block 128 where a table look-up operation of FIG. 21 is performed to determine a correction vehicle speed value delta V1 and then a table look-up operation of FIG. 22 to determine a correction vehicle speed value delta V2. The control then goes to a block 130. In the block 130, a sum of delta V1 and delta V2 is added to the base reference vehicle speed value V0 to give a result as a reference vehicle speed NV. In the next block 132, there is an interrogation whether the current vehicle V is less than or equal to the reference vehicle speed NV. If V is less than or equal to NV, the control goes to a block 134 where there is an interrogation whether a flag F is reset. Initially, the flag F is reset so that the control goes to a block 136 where the motor 22 is activated. Then, the control goes to a block 138 where the flag F is set before the control returns to the main routine. In the subsequent run of this sub-routine initiated upon elapse of a predetermined time, if V is still less than or equal to NV in the block 132, the control goes to the block 134 and then returns to the main routine since the flag F is set, leaving the motor 22 in operation. In the subsequent run of this sub-routine, if the interrogation in the block 132 results in nagative (NO), the control goes to a block 140. In the block 140, there is an interrogation whether the flag F is set. Since the flag F has been set, the control goes from the block 140 to a block 142. In the block 142, the motor 22 is deactivated to stop operation of the auxiliary pump 24. Then, the control goes to a block 144 where the flag F is reset. In the subsequent run of the sub-routine, if V is greater than NV in the block 132, the control goes to the block 140 and then returns to the main routine since the flag F has been reset, leaving the motor 22 out of operation.

Figure 22:
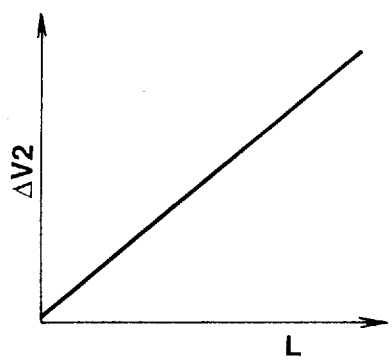
FIG. 22 is a graphical representation of a correction value variable dependent on detected distance travelled by the motor vehicle.

From the preceding description of the control strategy along with FIGS. 20, 21 and 22, it is seen that there has been made a compensation for a drop in pressure in the line pressure passage 21a due to an increase in leak of oil through the valves caused by a drop in viscosity of oil. The viscosity of oil drops in response to an increase in oil temperature T and an increase in distance L travelled by the motor vehicle.

It is also seen that the auxiliary motor 22 operates to provide an additional supply of oil to the line pressure passage 21a when the current vehicle speed V is less than the reference vehicle speed NV, while the main pump 20 continues to provide supply of oil to the line pressure passage 21a in accordance with speed of the center shaft 56 (see FIG. 2). When the current vehicle speed V exceeds the reference vehicle speed NV and 2WD mode is selected, the auxiliary pump 24 stops its operation and the main pump 20 provides oil to the line pressure passage 21 at a sufficiently high rate.

The characteristic curve shown in FIG. 21 reflects at least a change in viscosity of oil in relation to temperature of oil. The characteristic curve shown in FIG. 22 reflects at least a change in viscosity of oil in relation to the distance travelled by the motor vehicle. Since the reference vehicle speed NV is increased by the sum of correction values of delta V1 and delta V2 derived from FIGS. 21 and 22, the additional supply of oil by the auxiliary pump 24 is effective to prevent a drop in the line pressure PL due to the increased oil leak caused by a drop in viscosity of oil.

Referring to FIG. 23, a control strategy of solenoid activating pressure solenoid 42d of the system shown in FIGS. 17 and 18 is described. Execution of sub-routine shown in FIG. 23 is repeated at regular intervals.

In a block 150 of FIG. 23, there is an interrogation whether the 2WD mode is instructed or selected. If this is the case, the control goes to a block 152 where reading operation of the output of the vehicle speed sensor 102 is performed to store the detected current vehicle speed as V. Then, the control goes to a block 154 where there is an interrogation whether the current vehicle speed V is greater than a reference vehicle speed VL. If this is the case, the control goes to a block 156. In the block 156, the control unit 5 sets 100% as duty ratio of the clutch activating pressure solenoid 42d. Then, the control goes to a block 158 where the duty ratio is output and the clutch activating pressure solenoid 42d is kept energized, allowing the clutch activating pressure regulator valve 36 to provide the highest level of clutch activating pressure PC to the inlet port 40A of the mode selector valve 40' (see FIGS. 17 & 18). If the current vehicle speed V is less than or equal to the reference vehicle speed VL, the control goes to a block 160. In the block 160, the control unit 5 sets 0% as the duty ratio of the clutch activating pressure solenoid 42d, and the duty ratio of 0% is output in the block 158. Under this condition, the clutch activating pressure solenoid 42d is not energized and the clutch activating pressure regulator valve 36 provides the lowest level of clutch activating pressure PC to the inlet port 40A of the mode selector valve 40' (see FIGS. 17 & 18).

If 2WD mode is not instructed, the control goes from the block 150 back to the main routine.

Let us now consider that the motor vehicle is travelling at vehicle speeds lower than the reference vehicle speed VL. Under this condition, the line pressure PL supplied to the signal pressure port 40P2 urges the spool 40e of the mode selector valve 40' against the spring 40a toward the 2WD mode position as illustrated by the right half thereof in FIG. 18. When the line pressure PL is sufficiently high enough to hold the spool 40e at the 2WD mode position, leak of oil from the inlet port 40A to the outlet port 40B is prevented or at least minimized. However, if the level of the line pressure PL drops, the flow communication allowing the leak increases. According to the control strategy just described along with the flow diagram of FIG. 23, the clutch activating pressure PC always supplied to the inlet port 40A is kept at the lowest level when the vehicle speed V is less than the reference vehicle speed V, thus minimizing the transfer of oil to the servo chamber 58f of the VTT clutch 58 under the condition when the line pressure PL drops.

Referring back to FIGS. 15 and 17, it is now briefly explained when the auxiliary pump 24 is put in operation to discharge oil. The control unit 5 activates the motor 22 to put the auxiliary pump 24 in operation when the powertrain of the motor vehicle is in neutral state, when the motor vehicle travels forwardly at low speeds below the reference vehicle speed NV (see FIG. 20) with 2WD mode, and when the vehicle travels rearwardly with 2WD mode. The auxiliary pump 24 is kept in operation when the motor vehicle travels with 4WD mode, but it is out of operation during forward travel of the motor vehicle at high speeds exceeding the reference vehicle speed NV with 2WD mode. The main pump 20 is always in operation to discharge oil except when the powertrain is in neutral.

This control strategy of the motor 22 is applied to two hydraulic circuits which are alternative to the hydraulic circuit of FIG. 15.

Figure 24:
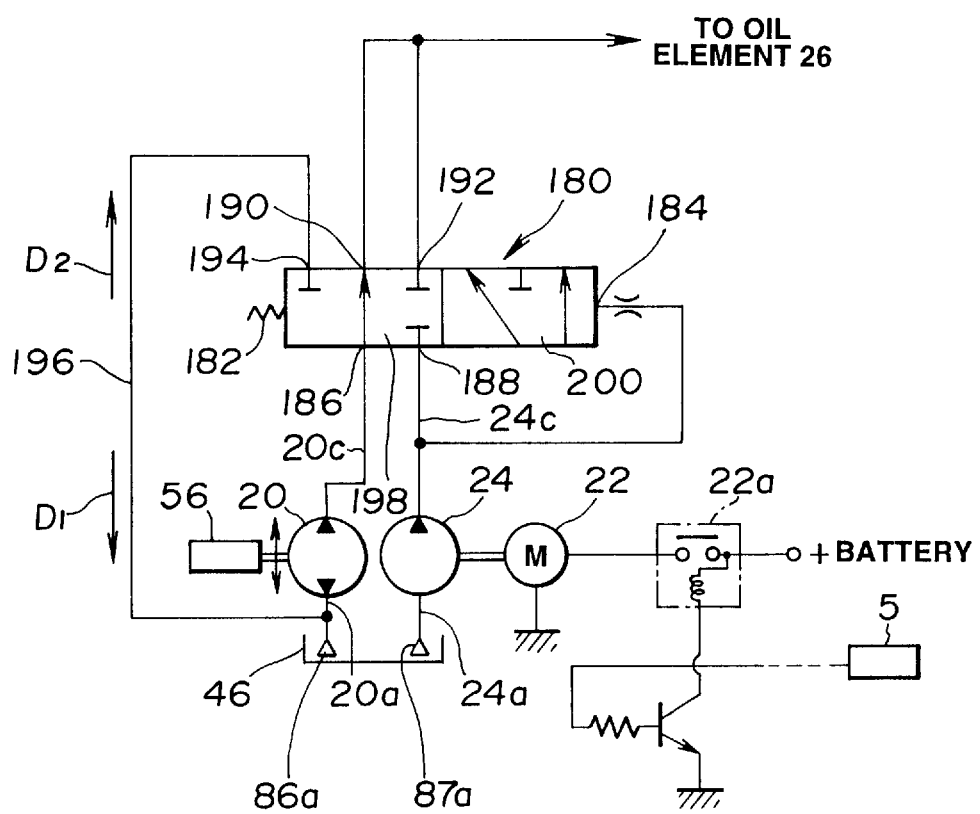
FIG. 24 is a fragmentary view of a hydraulic circuit of the actuator.

FIG. 24 shows, in a diagram, only a portion of the hydraulic circuit with which this hydraulic circuit is distinguished from the hydraulic circuit of FIG. 15. According to the circuit shown in FIG. 24, oil discharged by an auxiliary pump 24 is delivered via an oil element 26 to a line pressure regulator valve 32 (see FIG. 15) when an electric motor 22 is being activated, while oil discharged by a main pump 20 is not delivered to the oil element 26. When the motor 22 is not activated during forward travel of a motor vehicle at high speeds exceeding the reference vehicle NV (see FIG. 20), oil discharged by the main pump 20 is delivered via the oil element 26 to the line pressure regulator valve 32. In order to minimize load imposed on the enter shaft 56 (see FIG. 2) by the main pump 20, the main pump 20 is put into a no load circuit when the auxiliary pump 24 is in operation. When the main pump 20 is put into the no load circuit, all of oil discharged by the main pump 20 is allowed to return to a tank 46 through an uninterrupted passage.

The no load circuit is established by a delivery control valve 180. This valve 180 has a spring 182 and a signal pressure port 184 communicating via an orifice with a passage 24 connected to a discharge side of the auxiliary pump 24. The valve 180 also has an inlet/outlet port 186 communicating with a passage 20 fluidly connected to the main pump 20, an inlet port 188 communicating with the passage 24, a main pump outlet port 190 fluidly connected to the oil element 26, an auxiliary pump outlet port 192 fluidly connected to the oil element 26, and an outlet/inlet port 194 communicating with one end of an uninterrupted no load passage 196. The opposite end of this passage 196 is connected to a passage 20a connected between a suction side of the main pump 20 and a filter chamber 86a of an oil strainer unit 86 (see FIG. 4). The delivery control valve 180 has two valve positions, namely a spring set first position 198 and a second position 200. When pressure of oil discharged by the auxiliary pump 24 is less than a predetermined pressure value determined by the spring 18c, the valve 180 takes the first position 198 owing to the bias of the spring 182. In this position 198, a fluid communication between the ports 186 and 190 is established, the ports 188 and 192 are covered to block a fluid communication between them, and the port 194 is covered. Thus, a flow communication between the ports 186 and 194 is blocked or interrupted. The delivery control valve 180 takes the spring set first position 198 when the auxiliary pump 24 is out of operation or fails to operate in a desired manner. Under this condition, oil discharged by the main pump 20 is delivered to the oil element 26.

When the auxiliary pump 24 is in operation to discharge oil in the desired manner, the pressure at the signal pressure port 184 exceeds the predetermined pressure value. Under this condition, the delivery control valve 180 takes the second position 200. In this valve position 200, the main pump outlet port 190 is covered, the inlet port 188 and auxiliary pump outlet port 192 are uncovered to establish a flow communication therebetween, and the port 194 is uncovered to establish flow communication with the port 186. Under this condition, oil discharged by the auxiliary pump 24 is delivered to the oil element 26, and all of oil discharged by the main pump 20 passes through the uninterrupted no load passage 196 to return to the tank 46. An arrow designated by the reference character D1 shows a direction of flow through the passage 196 during forward travel of the motor vehicle, while an arrow designated by the reference character D2 shows a direction of flow through the passage 196 during reverse travel of the motor vehicle.

It is seen from FIG. 24 that when the delivery control valve 180 takes the second position 200, the no load circuit is established by the passage 20a, main pump 20, passage 20c, delivery control valve 180 and uninterrupted no load passage 196, and this no load circuit is interrupted when the delivery control valve 180 takes the spring set first position 198.

It will now be appreciated that owing to the provision of the no load circuit, the load imposed on the center drive shaft 56 by the main pump 20 is minimized during operation of the auxiliary pump 24 that is driven by the electric motor 22.

It will also be appreciated that the delivery control valve 180 takes the spring set first position 198 when the auxiliary pump 24 fails to discharge at a sufficiently high pressure, thus allowing the main pump 20 to take over the role of supplying oil to the oil element 26.

According to FIG. 24, a pressure at which oil is discharged by the main pump 20 or a pressure at which oil is discharged by the auxiliary pump 24 are supplied to the circuit elements of the hydraulic circuit. Preferably, for the purpose of suppressing an excessive increase in stress which the circuits elements are subject to, pressure reduction valves 210 and 212 should be provided as shown in FIG. 25.

Figure 25:
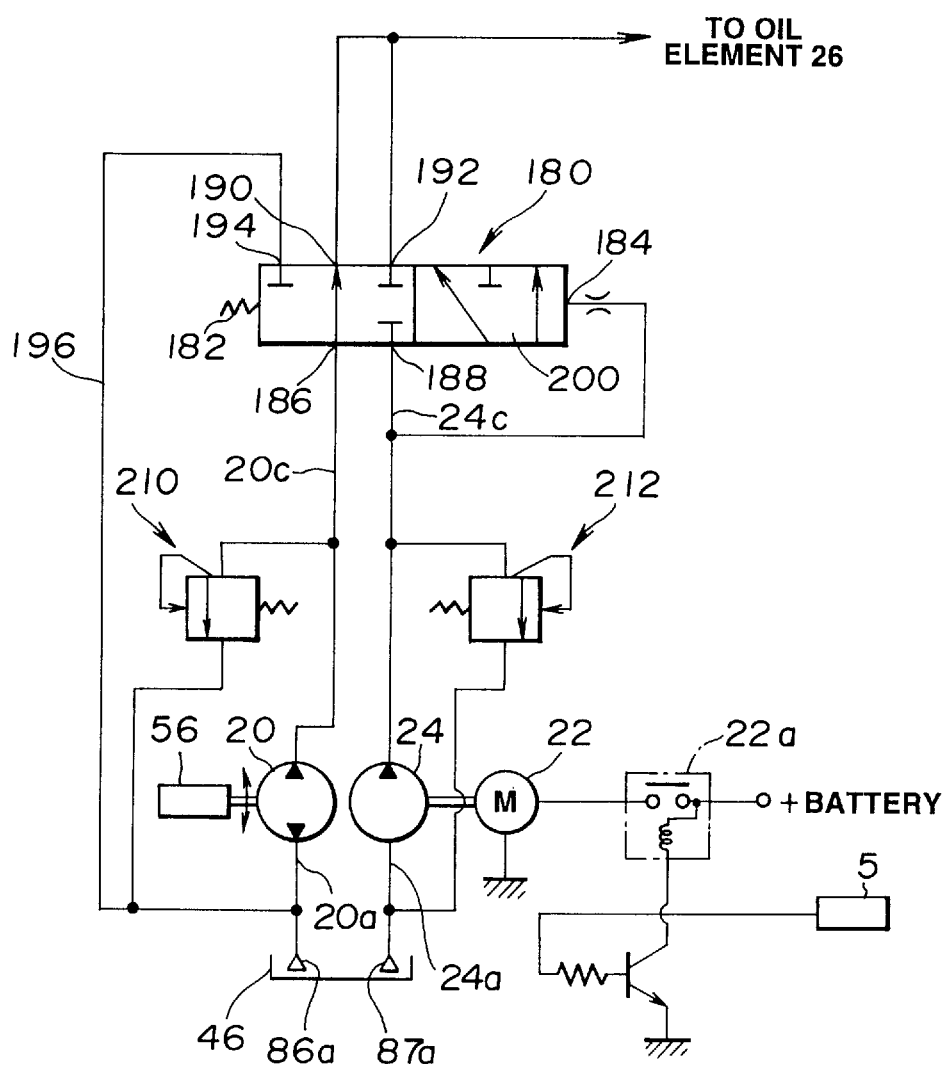
FIG. 25 is a fragmentary view of a modification of the hydraulic circuit of FIG. 24.

In FIG. 25, the reduction valve 210 has an inlet port communicating with a passage 20c and an outlet port fluidly connected with a passage 20a, while the reduction valve 212 has an inlet port communicating with a passage 24c and an outlet port communicating with a passage 24a. If an excessive pressure develops in the passage 20c, the pressure reduction valve 210 is opened to discharge oil toward an oil tank 46. Similarly, if an excessive pressure develops in the passage 24c, the pressure reduction valve 212 is opened to discharge oil toward the oil tank 46.

What is claimed is:

1. A motor vehicle having a set of front wheels, a set of rear wheels, an engine, and a transmission driven by the engine and having a transmission output shaft comprising:

means, including a variable torque transmitting (VTT) clutch, for varying a distribution of torque produced by the engine between the front wheels and the rear wheels depending upon degree of engagement of said VTT clutch;

means for generating a line hydraulic fluid pressure in response to a first control signal;

means, receiving said line hydraulic fluid pressure generated by said line hydraulic fluid pressure generating means, for generating a clutch activating hydraulic fluid pressure in response to a second control signal;

means for transmitting said clutch activating hydraulic fluid pressure to said VTT clutch in response to a third control signal; and means for controlling said line hydraulic fluid pressure generating means, said clutch activating hydraulic fluid pressure generating means, and said clutch activating hydraulic fluid pressure transmitting means, said controlling means applying said first control signal to said line pressure generating means, said controlling means applying said second control signal to said clutch activating hydraulic fluid pressure generating means, and said controlling means applying said third control signal to said clutch activating hydraulic fluid pressure transmitting means.

2. A motor vehicle as claimed in claim 1, wherein said clutch activating hydraulic fluid pressure transmitting means include a mode selector valve disposed between said clutch activating hydraulic fluid pressure generating means and said VTT clutch and having a four-wheel drive (4WD) mode position in which a fluid communication between said clutch activating hydraulic fluid pressure generating means and said VTT clutch is established and a two-wheel drive mode position.

3. A motor vehicle as claimed in claim 2, wherein said clutch activating hydraulic fluid pressure transmitting means includes solenoid operable means for selectively applying said line hydraulic fluid pressure to said mode selector valve.

4. A motor vehicle as claimed in claim 3, including a pressure switch so constructed and arranged as to provide a switch output to said controlling means when hydraulic fluid pressure transmitted to said VVT clutch is higher than a predetermined value and wherein said controlling means is operative to conduct a test routine wherein a test is considered to be passed when said switch output is present after predetermined test conditions have been met.

5. A motor vehicle as claimed in claim 4, wherein said controlling means is operative to store the fat that said test fails to be passed when said switch output is absent after said predetermined test conditions have been met.

6. A motor vehicle as claimed in claim 5, wherein said predetermined test conditions are met when, upon start-up of the engine, said mode selector valve is urged to shift to said 4WD mode position.

7. A motor vehicle as claimed in claim 3, wherein said line hydraulic fluid pressure generating means include a tank containing hydraulic fluid, a main pump communicating with said tank and driven by the transmission output shaft for discharging hydraulic fluid, an electric motor, an auxiliary pump communicating with said tank and driven by said electric motor for discharging hydraulic fluid, and a line pressure regulator valve communicating with said main and auxiliary pumps and effecting pressure regulation on the discharged hydraulic fluid to provide said line hydraulic fluid pressure.

8. A motor vehicle as claimed in claim 7, wherein said mode selector valve is urged toward said 4WD mode position upon application thereto of said line hydraulic fluid pressure.

9. A motor vehicle as claimed in claim 8, including sensing means for monitoring the operation of said main pump to provide an output distinguishing first pump operation wherein said main pump can discharge hydraulic fluid at a rate sufficiently high enough to keep the magnitude of said line hydraulic fluid pressure above a predetermined level from a second pump operation wherein said main pump fails to discharge hydraulic fluid at a rate sufficiently high enough to keep the magnitude of said line hydraulic fluid pressure above said predetermined level.

10. A motor vehicle as claimed in claim 9, wherein said clutch activating hydraulic fluid pressure generating means include a clutch activating hydraulic fluid pressure regulator valve operative to effect pressure regulation in response to a boost pressure supplied thereto to provide said clutch activating hydraulic fluid pressure and clutch activating pressure solenoid operable means adapted for varying magnitude of said boost pressure, thus varying the magnitude of said clutch activating hydraulic fluid pressure.

11. A motor vehicle as claimed in claim 10, wherein said controlling means is operative responsive to said distinguishing output to cause said clutch activating pressure solenoid operable means to set said boost pressure at such a magnitude as to cause said clutch activating hydraulic fluid pressure regulator valve to set said clutch activating hydraulic fluid pressure at the lowest magnitude thereof upon selection of two wheel drive mode during said second pump operation.

12. A motor vehicle as claimed in claim 11, wherein said controlling means is operative responsive to said distinguishing output to cause said clutch activating pressure solenoid operable means to set said boost pressure at such a magnitude as to cause said clutch activating hydraulic fluid pressure regulator to set said clutch activating hydraulic fluid pressure at the highest magnitude thereof upon selection of two wheel drive mode during said first pump operation.

13. A motor vehicle as claimed in claim 12, wherein said sensing means includes a vehicle speed sensor to sense the operating vehicle speed of the motor vehicle to provide said distinguishing output.

14. A motor vehicle as claimed in claim 13, wherein said sensing means provides a first output signal when said sensed vehicle speed is greater than a reference vehicle speed value and a second output signal when said sensed vehicle speed is equal to or less than said reference vehicle speed value.

15. A motor vehicle as claimed in claim 7, including a vehicle speed sensor sensing the operating vehicle speed of the motor vehicle and wherein said controlling means is operative to put said electric motor in operation when said sensed vehicle speed is equal to or less than a reference vehicle speed value.

16. A motor vehicle as claimed in claim 15, wherein said controlling means is operative to put said electric motor out of operation when said sensed vehicle speed is greater than said reference vehicle speed value.

17. A motor vehicle as claimed in claim 16, wherein said controlling means is operative to correct said reference vehicle speed value.

18. A motor vehicle as claimed in claim 17, including a temperature sensor sensing temperature of said hydraulic fluid.

19. A motor vehicle as claimed in claim 17, including a distance recorder detecting the distance travelled by the motor vehicle.

20. A motor vehicle as claimed in claim 19, wherein said controlling means is operative to determine a second correction value in correspondance with said detected distance and is operative to correct said reference vehicle speed value by said second correction value.

21. A motor vehicle as claimed in claim 18, wherein said controlling means is operative to determine a first correction value in correspondence with said sensed operating temperature and is operative to correct said reference vehicle speed value by said first correction value.

22. A motor vehicle as claimed in claim 18, including a distance recorder detecting the distance travelled by the motor vehicle.

23. A motor vehicle as claimed in claim 22, wherein said controlling means is operative to determine a first correction value in correspondence with said sensed temperature and a second correction value in correspondence with said detected distance and is operative to correct said reference vehicle speed value by said first and second correction values.

24. A motor vehicle as claimed in claim 7, including a first strainer portion fluidly disposed between said tank and said main pump, a second strainer portion fluidly disposed between said tank and said auxiliary pump, and bypass means which is operative during reverse operation of said main pump for allowing a flow of hydraulic fluid from said second strainer portion to said main pump.

25. A motor vehicle as claimed in claim 24, wherein said bypass means includes a bypass passage having one end communicating with said second strainer portion and an opposite end communicating with said main pump on that side thereof which discharges hydraulic fluid during forward operation of said main pump and a check valve disposed in said passage in such a direction as to prevent a flow of hydraulic fluid through said bypass passage from said main pump toward said second strainer portion, but to allow a flow of hydraulic fluid through said bypass passage to said main pump from said second strainer portion.

26. A motor vehicle as claimed in claim 7, wherein said line hydraulic fluid pressure generating means include an oil element.

27. A motor vehicle as claimed in claim 26, including a casing having an inflow passage to said oil element and an outflow passage from said oil element.

28. A motor vehicle as claimed in claim 27, wherein said casing is formed with a recess and wall means defining said recess, and wherein said oil element includes a coupling received in said recess, said coupling and said recess defining wall means defining therebetween a clearance through which hydraulic fluid may pass toward the outside of said casing, said coupling being formed with a plurality of grooves receiving a plurality of O-rings, respectively, said plurality of O-rings being in engagement with said recess defining wall means at different locations of said clearance to define a fluid space between said coupling, said recess defining wall means, and said O-rings.

29. A motor vehicle as claimed in claim 28, wherein said casing is formed with a drain passage opening to said fluid space.

30. A motor vehicle as claimed in claim 27, including pressure relief means for directing a portion of hydraulic fluid from said inflow passage toward portions to be lubricated when a pressure within said inflow passage reaches a predetermined pressure value.

31. A motor vehicle as claimed in claim 30, wherein said pressure relief means include a passage having one end connected to said inflow passage and an opposite end communicating with said portions to be lubricated, and a pressure responsive relief valve disposed in said passage.

32. A motor vehicle as claimed in claim 1, wherein said line hydraulic fluid pressure generating means include a tank containing hydraulic fluid, a main pump communicating with said tank and driven by the transmission output shaft for discharging hydraulic fluid, an electric motor, an auxiliary pump communicating with said tank and driven by said electric motor for discharging hydraulic fluid, a regulator valve, and delivery control valve means fluidly disposed between said main and auxiliary pumps and said regulator valve for establishing a no load circuit including said main pump in response to a pressure at which hydraulic fluid is discharged by said auxiliary pump.

33. A motor vehicle as claimed in claim 32, wherein said line hydraulic fluid pressure generating means include a first pressure reduction valve fluidly disposed between said main pump and said delivery control valve means and a second pressure reduction valve fluidly disposed between said auxiliary pump and said delivery control valve means.

34. A motor vehicle as claimed in claim 32, wherein said delivery control valve means has a first position in which said no load circuit is interrupted, and a second position in which said no load circuit is established.

35. A motor vehicle as claimed in claim 34, wherein when said delivery control valve means is in said first position thereof, a fluid communication between said main pump and said regulator valve is established and a fluid communication between said auxiliary pump and said regulator valve is blocked, while when said delivery control valve means is in said second position thereof, said fluid communcation between said main pump and said regulator valve is blocked and said fluid communication between said auxiliary pump and said regulator valve is established.

36. A motor vehicle as claimed in claim 35, wherein said delivery control valve means assumes said first position thereof when said pressure at which hydraulic fluid is discharged by said auxiliary pump is less than a predetermined pressure value, while said delivery control valve means assumes said second position thereof when said pressure at which hydraulic fluid is dischareged by said auxiliary pump reaches said predetermind pressure value.

37. A motor vehicle as claimed in claim 36, wherein said line hydraulic fluid pressure generating means include a first pressure reducting valve fluidly disposed between said main pump and said delivery control valve means and a second pressure reduction valve fluidly disposed between said auxiliary pump and said delivery control valve means.

38. A motor vehicle as claimed in claim 37, wherein said controlling means is operative to energize said electric motor to activate said auxiliary pump when the transmission is neutral or when the motor vehicle travels forwardly at vehicle speeds lower than a reference vehicle speed value or when the motor vehicle travels rearwardly.

39. A motor vehicle as claimed in claim 10, including a transfer casing and wherein said distribution varying means include a first shaft driven by the transmission output shaft and a second shaft, said first and second shafts being rotatably supported within said transfer casing in spaced and parallel relationship, and said distribution varying means further include a power transmission unit having an endless power transmission member drivingly interconnecting said first and second shafts through said VTT clutch.

40. A motor vehicle as claimed in claim 39, wherein said line hydraulic fluid pressure generating means, said clutch activating fluid pressure generating means, and said clutch activating hydraulic fluid pressure transmitting means include a valve body mounted within said transfer casing.

41. A motor vehicle as claimed in claim 40, wherein said controlling means include a harness connected to said clutch activating hydraulic fluid pressure generating means and also to said clutch activating hydraulic fluid pressure transmitting means.

42. A motor vehicle as claimed in claim 41, wherein said harness is arranged on and fixedly attached to said valve body.

43. A motor vehicle as claimed in claim 42, wherein said solenoid operable means of said clutch activating hydraulic fluid pressure generating means include a clutch activating pressure solenoid mounted to said valve body and projecting outwardly of said valve body in a direction disposed in a plane normal to an axis of rotation of said first shaft.

44. A motor vehicle as claimed in claim 43, wherein said transfer casing has a port opening through which said harness passes toward the outside of said transfer casing.

45. A motor vehicle as claimed in claim 44, including a harness cover disposed adjacent said port opening and fixedly attached to said transfer casing, said harness cover including a portion extending between said harness and said endless power transmission member to cover said harness.

46. A motor vehicle as claimed in claim 45, including a baffle plate arranged between said valve body and said endless power transmission member in spaced relationship with respect to said endless power transmission member.

47. A motor vehicle as claimed in claim 46, wherein said valve body is fixedly attached to said transfer casing by means of a plurality of bolts, and wherein said baffle plate extends to cover some of said plurality of bolts.

48. A motor vehicle as claimed in claim 46, wherein said transfer casing serving as a tank containing hydraulic fluid, and wherein said line hydraulic fluid pressure generating means include a main pump mounted within said transfer casing.

49. A motor vehicle as claimed in claim 48, wherein said transfer casing has a fluid port communicating with said main pump.

50. A motor vehicle as claimed in claim 49, wherein said line hydraulic pressure generating means include an oil strainer unit having a discharge port coupled with said fluid port of said transfer casing, said oil strainer unit being biased against said valve body by said baffle plate.

51. A motor vehicle as claimed in claim 48, wherein said line hydraulic fluid pressure generating means include an auxiliary pump mounted within said transfer casing, wherein said transfer casing has a first fluid port communicating with said main pump, and wherein said valve body has a second fluid port communicating with said auxiliary pump.

52. A motor vehicle as claimed in claim 51, wherein said line hydraulic pressure generating means include an oil strainer unit having a first discharge port coupled with said first fluid port with an O-ring therebetween and a second discahrge port coupled with said second fluid port with a lip packing therebetween.

53. A motor vehicle as claimed in claim 52, wherein said oil strainer unit has a first filter chamber and a second filter chamber, and wherein said oil strainer unit has a first inflow port opening to said first filter chamber and a second inflow port opening to said second filter chamber, and wherein said first and second dischage ports open to said first and second filter chambers, respectively.

54. A motor vehicle as claimed in claim 3, including a transfer casing and wherein said distribution varying means include a first shaft driven by the transmission output shaft and a second shaft, said first and second shafts being rotatably supported within said transfer casing in spaced and parallel relationship, and said distribution varying means further include a power transmission unit having an endless power transmission member drivingly interconnecting said first and second shafts through said VTT clutch.

55. A motor vehicle as claimed in claim 54, wherein said line hydraulic fluid pressure generating means, said clutch activating fluid pressure generating means, and said clutch activating hydraulic fluid pressure transmitting means include a valve body.

56. A motor vehicle as claimed in claim 55, wherein said valve body is mounted within said transfer casing.

57. A motor vehicle as claimed in claim 56, wherein said transfer casing has a mount site in spaced relationship from said endless power transmission member, and wherein said valve body is attached to said mount site.

58. A motor vehicle as claimed in claim 57, wherein said valve body is spaced from said endless power transmission member in a direction parallel to an axis of rotation of said first shaft.

59. A motor vehicle as claimed in claim 58, wherein said solenoid operable means includes a mode selector solenoid mounted to said valve body and projecting outwardly of said valve body toward a space surrounded by said endless power transmission member.

60. A motor vehicle as claimed in claim 57, wherein said transfer casing includes a front casing and a rear casing, said front and rear casings being attached to each other at an interface plane, and wherein said mount site is flat surface extending in parallel relationship with said interface plane.

61. A motor vehicle as claimed in claim 56, wherein said controlling means include a harness connected to said clutch activating hydraulic fluid pressure generating means and also to said clutch activating hydraulic fluid pressure transmitting means.

62. A motor vehicle as claimed in claim 61, wherein said harness is arranged on and fixedly attached to said valve body.

63. A motor vehicle comprising:

a set of first wheels;

a set of second wheels, an engine;

a transmission driven by said engine, said transmission having a transmission output shaft;

a transfer including a center drive shaft connected between said transmission output shaft and said second wheels and a variable torque transmitting (VVT) clutch operatively disposed between said center drive shaft, said first wheels, and said second wheels, said VVT clutch being engaged to various degrees for varying distribution of torque of said center drive shaft between said front wheels and said rear wheels;

an oil tank;

a main pump having a rotor, said main pump having a first side communicating with said oil tank and a second side;

said center drive shaft coupled to said rotor of said main pump, said center drive shaft being operative to rotate in a first direction during forward travel of the motor vehicle to turn said rotor so that said main pump draws oil from said oil tank via said first side of said main pump and discharges the oil via said second side of said main pump;

an auxiliary pump having a first side communicating with said oil tank and a second side;

an electric motor coupled to said auxiliary pump, said electric motor being operative in response to a first control signal to turn said auxiliary pump so that said auxiliary pump draws oil from said oil tank via said first side of said auxiliary pump and discharges the oil via said second side of said auxiliary pump;

a valve disposed between said second side of said main pump and said oil tank, said valve being operative to allow uninterrupted flow of oil from said oil tank to said second side of said main pump;

said center drive shaft being operative to rotate in a second direction opposite to said first direction during reverse travel of the motor vehicle to turn said rotor so that said main pump draws oil from said oil tank via said second side of said main pump and discharges the oil via said first side of said main pump;

a line pressure regulator valve regulating the oil discharged by said main pump via said second side of said main pump and the oil discharged by said auxiliary pump via said second side of said auxiliary pump to generate a line pressure;

a clutch activating pressure regulator valve receiving said line pressure generated by said line pressure regulator valve, said clutch activating pressure regulator valve being operative to regulate said line pressure in response to a signal pressure to generate a clutch activating pressure;

a solenoid operated booster valve operative in response to a second control signal to generate said signal pressure applied to said clutch activating pressure regulator valve;

a mode selector valve having a two wheel mode position wherein transmission of said clutch activating pressure to said VVT clutch is interrupted and a four wheel mode position wherein transmission of said clutch activating pressure to said VVT clutch is allowed, said mode selector valve being operative in response to a mode selection pressure to switch between said two wheel mode position and said four wheel mode position;

a solenoid operated valve having a mode selector solenoid operative in response to a third control signal to provide said mode selection pressure to said mode selector valve; and a control unit operative to generate said first control signal and to apply said first control signal to said control unit being operative to generate said second control signal and to apply said second control signal to said solenoid operated booster valve, said control unit being operative to generate said third control signal and to apply said third control signal to said mode selector solenoid.

64. A motor vehicle as claimed in claim 63, wherein said valve that is disposed between said second side of said main pump and said oil tank is a one-way check valve.

65. A motor vehicle as claimed in claim 63, wherein said valve that is disposed between said second side of said main pump and said oil tank shifts in response to the presence of pressure of oil discharged by said auxiliary pump to a first position wherein said second side of said main pump communicates with said oil tank.

66. A motor vehicle as claimed in claim 65, wherein said valve that is disposed between said second side of said main pump and said oil tank shifts in response to the absence of pressure of oil discharged by said auxiliary pump to a second position wherein said second side of said main pump is prevented from communicating with said oil tank.

* * * * *